US008865338B2

(12) United States Patent
Sugawara et al.

(10) Patent No.: US 8,865,338 B2
(45) Date of Patent: Oct. 21, 2014

(54) BATTERY MODULE AND BATTERY DEVICE

(75) Inventors: Tatsuo Sugawara, Hitachinaka (JP);
Shinichi Fujino, Mito (JP); Hideki Honma, Hitachinaka (JP); Sadashi Seto, Hitachinaka (JP)

(73) Assignees: Hitachi Automotive Systems, Ltd., Hitachinaka-shi (JP); Hitachi, Ltd., Tokyo (JP)

( * ) Notice: Subject to any disclaimer, the term of this patent is extended or adjusted under 35 U.S.C. 154(b) by 654 days.

(21) Appl. No.: 12/709,197

(22) Filed: Feb. 19, 2010

(65) Prior Publication Data

US 2010/0248008 A1    Sep. 30, 2010

(30) Foreign Application Priority Data

Mar. 31, 2009   (JP) ................................ 2009-087006

(51) Int. Cl.
| H01M 6/42 | (2006.01) |
| H01M 2/10 | (2006.01) |
| H01M 10/48 | (2006.01) |
| H01M 2/20 | (2006.01) |

(52) U.S. Cl.
CPC .......... *H01M 10/482* (2013.01); *H01M 2/1083* (2013.01); *H01M 2/206* (2013.01); *Y02E 60/12* (2013.01); *H01M 2/1077* (2013.01)
USPC ......................................... 429/159; 429/170

(58) Field of Classification Search
USPC .................. 429/159, 158, 163, 160, 161, 170
See application file for complete search history.

(56) References Cited

U.S. PATENT DOCUMENTS

| 5,450,013 | A * | 9/1995 | Miyata et al. ................. 324/393 |
| 6,168,470 | B1 | 1/2001 | Ikeda et al. |
| 6,379,837 | B1 * | 4/2002 | Takahashi et al. ............ 429/151 |
| 2004/0043287 | A1 * | 3/2004 | Bando et al. ................... 429/156 |
| 2006/0262482 | A1 | 11/2006 | Yamamoto et al. |
| 2007/0141459 | A1 | 6/2007 | Goto et al. |
| 2011/0048526 | A1 * | 3/2011 | Ishida et al. .................. 136/256 |

FOREIGN PATENT DOCUMENTS

| JP | 11-120986 A | 4/1999 |
| JP | 2000-182583 A | 6/2000 |
| JP | 2000-223160 A | 8/2000 |
| JP | 2002-117821 A | 4/2002 |
| JP | 2003-45504 A | 2/2003 |
| JP | 2006-324060 A | 11/2006 |
| JP | 2007-165164 A | 6/2007 |
| JP | 2009-163932 A | 7/2009 |
| JP | 2009-218011 A | 9/2009 |

OTHER PUBLICATIONS

Japanese-language Office Action dated Apr. 16, 2013 with English translation (Eleven (11) pages).

* cited by examiner

*Primary Examiner* — Mark F Huff
*Assistant Examiner* — Monique Wills
(74) *Attorney, Agent, or Firm* — Crowell & Moring LLP

(57) ABSTRACT

A battery module includes: a plurality of battery cells; a casing in which the plurality of battery cells are housed; a plurality of conductive members that electrically connect the plurality of battery cells; and a voltage detection conductor that detects voltages at each of the plurality of battery cells. The casing includes at least a pair of resin side plates that sandwich and support the plurality of battery cells from both sides. The voltage detection conductor is formed in a predetermined shape and integrated with the side plates.

7 Claims, 10 Drawing Sheets

BATTERY MODULE AND BATTERY DEVICE

INCORPORATION BY REFERENCE

The disclosure of the following priority application is herein incorporated by reference: Japanese Patent Application No. 2009-087009 filed Mar. 31, 2009

BACKGROUND OF THE INVENTION

1 Field of the Invention

The present invention relates to a battery module including a plurality of battery cells, and a battery device.

2 Description of Related Art

Japanese Laid Open Patent Publication No. 2000-223160 discloses a power source system assuming a structure that enables it to include a plurality of battery modules stored in a battery case, each of which include a plurality of batteries connected in series, and a protection electronic circuit mounted on the battery case so as to protect the batteries in the battery modules (refer to patent reference literature 1). In the power source system described in patent reference literature 1, a busbar, which connects the plurality of battery modules, and the protection electronic circuit are connected to a lead wire through a fuse so as to detect voltage at each of the battery modules.

As the device disclosed in patent reference literature 1, there is an issue yet to be addressed in that the use of a lead wire for voltage detection requires a space for wiring and complicated wiring of the lead wire.

SUMMARY OF THE INVENTION

A battery module according to a first aspect of the present invention comprises: a plurality of battery cells; a casing in which the plurality of battery cells are housed; a plurality of conductive members that electrically connect the plurality of battery cells; and a voltage detection conductor that detects voltages at each of the plurality of battery cells, wherein: the casing comprises at least a pair of resin side plates that sandwich and support the plurality of battery cells from both sides; and the voltage detection conductor is formed in a predetermined shape and integrated with the side plates.

According to a second aspect of the present invention, in the battery module according to the first aspect, the plurality of conductive members may be mounted on the side plates at an outer side of the casing so as to connect the plurality of battery cells.

According to a third aspect of the present invention, in the battery module according to the first aspect, it is preferable that a front end section of the voltage detection conductor is connected to the plurality of conductive members; and another end section of the voltage detection conductor is provided with a current block device that blocks current from the battery cells.

According to a fourth aspect of the present invention, in the battery module according to the first aspect, the voltage detection conductor may be insert molded to the resin side plates in a state in which the voltage detection conductor is maintained in a predetermined shape with a resin material so as to be integrated with the side plates.

According to a fifth aspect of the present invention, in the battery module according to the first aspect, it is preferable that through-holes are formed on the side plates at positions corresponding to the plurality of battery cells; and the plurality of battery cells are mounted on the side plates with an adhesive member so as to seal the through-holes tightly.

According to a sixth aspect of the present invention, the battery module according to the first aspect may further comprises a metal cover member provided so as to cover an outside of the pair of side plates with respect to the casing, and the side plates may comprise a contact prevention mechanism to prevent the cover member and the conductive members from contacting each other.

A battery device according to a seventh aspect of the present invention comprises: a battery module according to the first aspect and a control device that is connected with the voltage detection conductor so as to detect voltages at the plurality of battery cells and controls stored charge at the plurality of battery cells.

DESCRIPTION OF PREFERRED EMBODIMENTS

The following is a detailed explanation of a battery module and a battery device according to an embodiment of the present invention, given in reference to drawings.

The following is an explanation of an example of the battery module according to the embodiment applied to the battery device that constitutes an on-vehicle power source system for electric vehicles, particularly electric automobiles. The electric vehicles include hybrid electric vehicles that include an internal combustion engine and an electric machine as a driving source of the vehicle and pure electric vehicles that include an electric machine as the only driving source of the vehicle.

Figure 1:
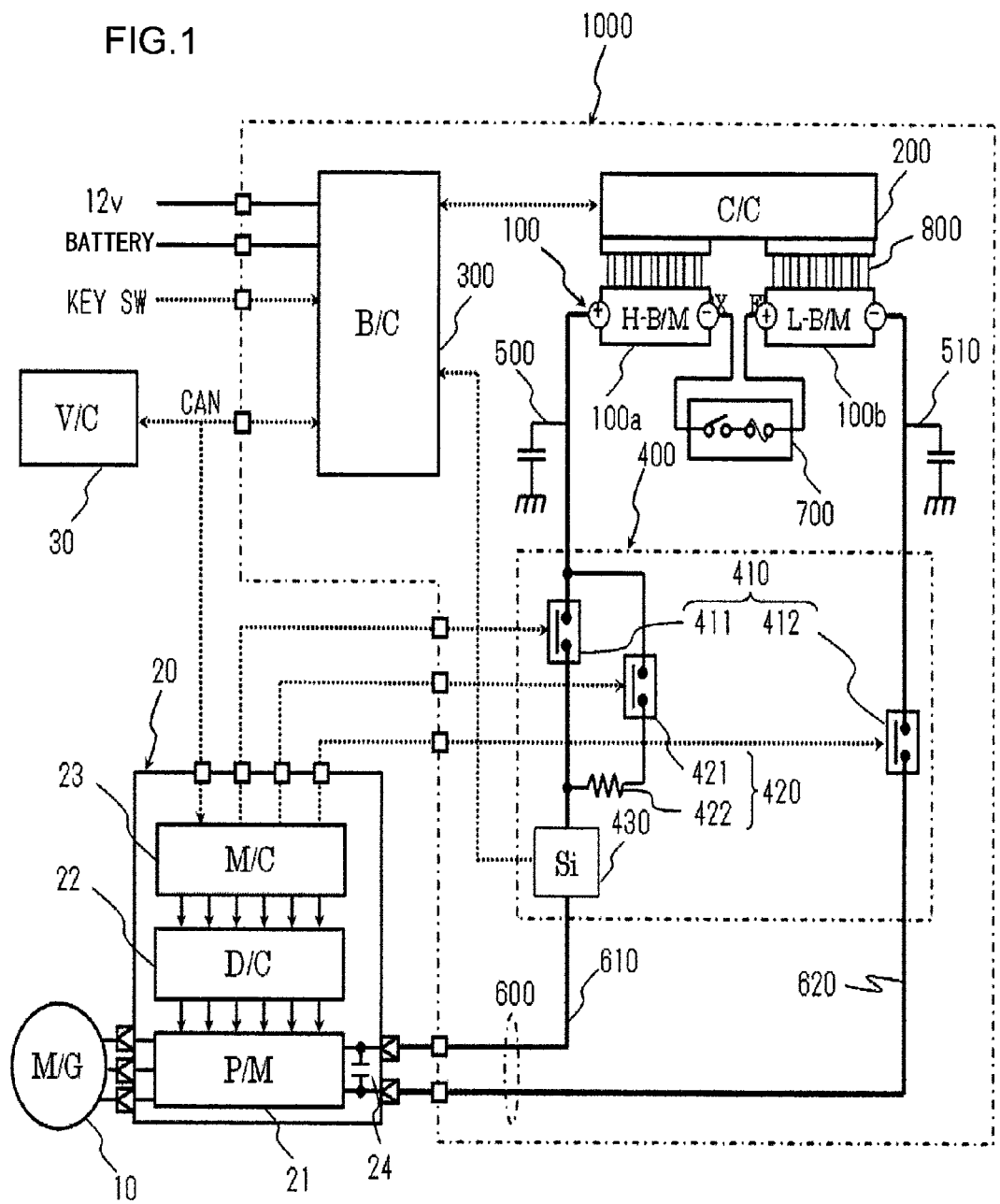
FIG. 1 is a block diagram showing the structure of the on-vehicle electrical machine system in which the battery device according to an embodiment of the present invention is used.

The structure of the on-vehicle electrical machine system (electrical machine driving system) that includes the battery module according to the embodiment will now be explained with reference to FIG. 1.

The on-vehicle electrical machine system includes a motor generator 10, an inverter device 20, a vehicle controller 30 that controls the whole vehicle, and a battery device 1000 that constitutes an on-vehicle power source system. The battery device 1000 includes a plurality of cells and is constituted as, for instance, a lithium ion battery device that includes a plurality of lithium ion battery cells.

The motor generator 10 is a three-phase AC (alternate current) synchronous machine. In a driving mode that requires rotational power such as, during power running of the vehicle or starting the internal combustion engine, the motor generator 10 drives the motor and supplies the generated rotational power to driven bodies such as wheels and the engine. In this case, the on-vehicle electrical machine system converts DC (direct current) power into three-phase AC electric power and supplies it from the lithium ion battery device 1000 to the motor generator 10 via the inverter device 20, which is an electric power conversion device.

In a driving mode that requires power generation, for example, during regeneration such as decelerating or braking of the vehicle and when the lithium ion battery device 1000 needs to be recharged, the motor generator 10 is driven by drive power from the wheels or the engine and generates three-phase AC electric power as a generator. In this case, the on-vehicle electrical machine system converts the three-phase AC electric power from the motor generator 10 into DC power via the inverter device 20 and supplies it to the lithium ion battery device 1000. As a result, electric power is accumulated in the lithium ion battery device 1000.

The motor generator 10 is an electric machine that is operated by magnetic influence of an armature (for example, a stator) and a field (for example, a rotor) which is disposed opposite the armature and rotatably supported. The motor generator 10 assumes a structure that enables the axis of rotation of the field mechanically to be connected to the axis of rotation of driven bodies such as the wheels and the engine so as to direct rotational power to and from the driven bodies.

The armature is a part that is supplied with three-phase AC electric power to generate a rotating magnetic field when the motor generator 10 is to be engaged in operation as a motor, while that generates three-phase AC electric power due to interlinkage of the magnetic flux when the motor generator 10 is to be engaged in operation as a generator. The armature includes an armature core (stator core), which is a magnetic material, and a three-phase armature coil (stator coil) attached to the armature core.

The field is a part that generates field magnetic flux when the motor generator 10 is to be engaged in operation as a motor or a generator, and includes a field core (rotor core), which is a magnetic material, and a permanent magnet and/or a field coil (rotor coil) that are attached to the field core. The field coil is supplied with field current from an external power source and excited to generate magnetic flux.

The inverter device 20 is an electronic circuit device that controls the above-described power conversion, i.e., the conversion from DC power to three-phase AC electric power and from three-phase AC electric power to DC power, by operation (ON/OFF) of a switching semiconductor device. The inverter device 20 includes a power module 21, a driver circuit 22, a motor controller 23, and a smoothing capacitor 24.

The power module 21 is a power conversion circuit that includes six switching semiconductor devices to perform the above-described power conversion by switching operation (ON/OFF) of the six switching semiconductor devices. A metal-oxide semiconductor field-effect transistor (MOSFET) or an insulated gate bipolar transistor (IGBT) is used for the switching semiconductor devices. In the event that the power module 21 is constituted with a MOSFET, parasitic diodes are electrically connected in inverse parallel between a drain electrode and a source electrode. On the other hand, in the event that the power module 21 is constituted with an IGBT, it is necessary separately to electrically connect diodes in inverse parallel between a collector and an emitter. The power conversion circuit is constituted with a three-phase bridge circuit in which series circuits (an arm for one phase), each of which includes two (an upper arm and a lower arm) switching semiconductor devices electrically connected in series, electrically connected in parallel for three phases.

The side of each upper arm opposite the lower arm connection side is electrically connected to a DC positive pole-side module terminal, and the side of each lower arm opposite the upper arm connection side is electrically connected to a DC negative pole-side module terminal. The middle point of each of the upper and the lower arms, i.e., the sides of each of the upper and the lower arms connecting to each other, are electrically connected to an AC-side module terminal. The DC positive pole-side module terminal and the DC negative pole-side module terminal are electrically connected to a DC positive pole-side external terminal and a DC negative pole-side external terminal, respectively. The DC positive pole-side external terminal and the DC negative pole-side external terminal are power source-side terminals to direct DC power to and from the lithium ion battery device 1000 and electrically connected with a power cable 600 that extends from the lithium ion battery device 1000. The AC-side module terminal is electrically connected to an AC-side external terminal. The AC-side external terminal is a load side terminal to direct three-phase AC electric power to and from the motor generator 10 and electrically connected with a load cable that extends from the motor generator 10.

The smoothing capacitor 24 is electrically connected in parallel between the DC positive pole-side and the DC negative pole-side of the power conversion circuit in order to inhibit a voltage fluctuation that occurs due to a high speed switching operation of the switching semiconductor devices constituting the power conversion circuit and the inductance parasitic in the power conversion circuit. A electrolytic capacitor or a film capacitor is used as the smoothing capacitor 24.

The motor controller 23 is an electronic circuit device to control the switching operation of the six switching semiconductor devices constituting the power conversion circuit. In response to a torque command having been output from the vehicle controller 30 that controls a higher-order control device, for instance the whole vehicle, the motor controller 23 generates a switching operation command signal (for example, PWM (pulse width modulation) signal) to the six switching semiconductor devices. The generated command signal is output to the driver circuit 22.

Based on the switching operation command signal having been output from the motor controller 23, the driver circuit 22 generates a drive signal to the six switching semiconductor devices constituting the power conversion circuit. The generated drive signal is output to a gate electrode of the six switching semiconductor devices constituting the power conversion circuit. As a result, based on the drive signal having been output from the driver circuit 22, the switching (ON/OFF) of the six switching semiconductor devices constituting the power conversion circuit is controlled.

Figure 2:
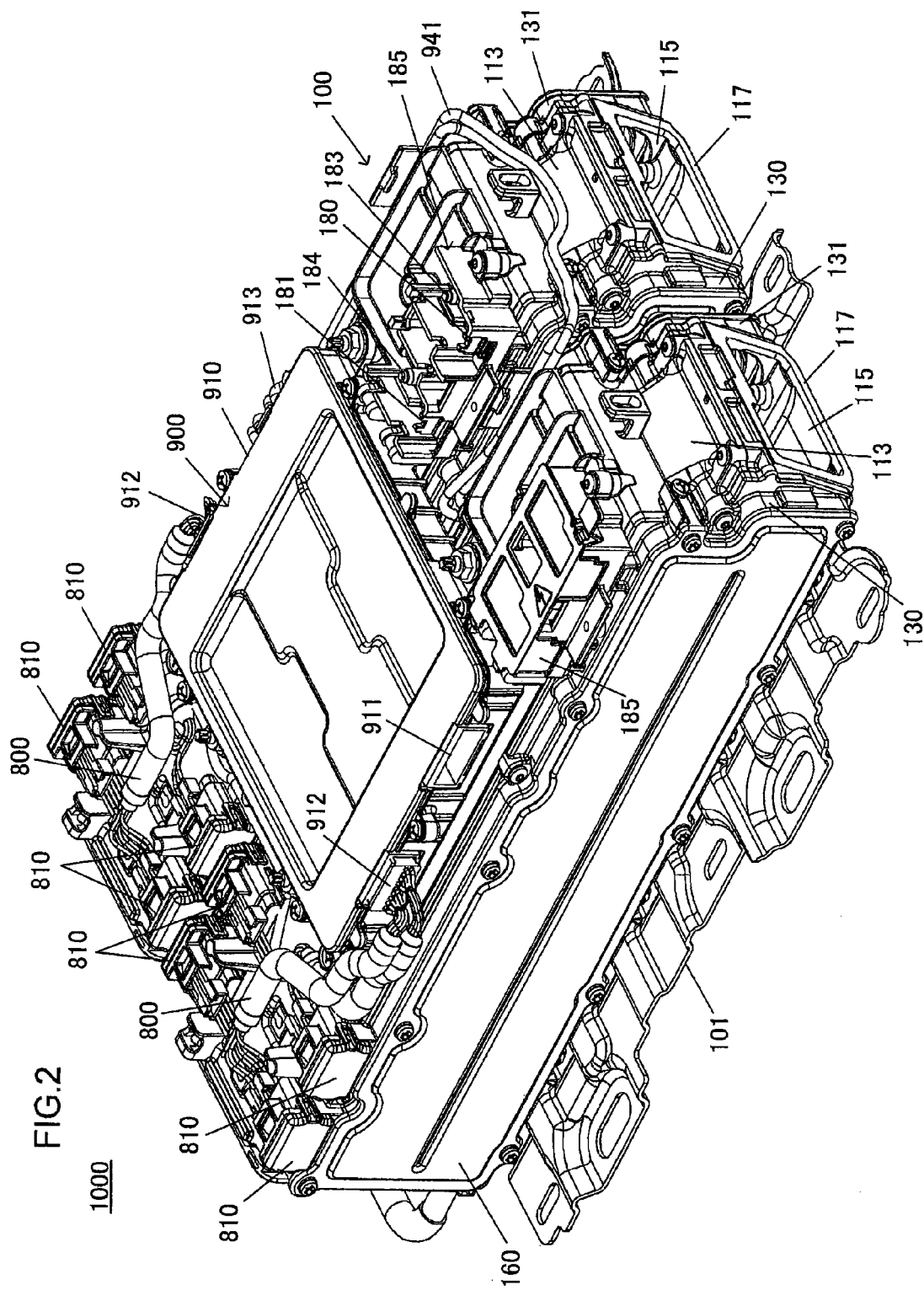
FIG. 2 is a perspective view showing the external appearance structure of a whole lithium ion battery device according to the embodiment of the present invention.

The lithium ion battery device 1000 includes a battery module (electric storage module) 100 to accumulate and release electrical energy (charge and discharge DC power) and a control device 900 to manage and control the state of the battery module 100 (refer to FIG. 2).

The battery module 100 is constituted with two battery blocks (or battery packs), i.e., a higher potential battery block 100a and a lower potential battery block 100b that are electrically connected in series. A battery assembly is housed in each of the battery blocks. Each of the battery assemblies is constituted with a combination of a plurality of lithium ion battery cells that are electrically connected in series. The structure of each of the battery blocks will be described later.

A SD (service disconnect) switch 700 is provided between the negative pole-side (lower potential) of the higher potential battery block 100a and the positive pole-side (higher potential) of the lower potential battery block 100b. The SD switch 700, a safety device provided to ensure the safety at maintenance and checks of the lithium ion battery device 1000, is constituted with an electrical circuit in which a switch and a fuse are electrically connected in series, and operated by a serviceman at the time of maintenance and checks.

The control device 900 is constituted with a higher-order (parent) battery controller 300 and a lower-order (child) cell controller 200.

The battery controller 300 manages and controls the state of the lithium ion battery device 1000 and reports the state of the lithium ion battery device 1000 and a charge and discharge control command to control limit charge and discharge electric power and the like to the vehicle controller 30, which is a higher-order control device, and the motor controller 23. The management and control of the state of the lithium ion battery device 1000 include measurement of the voltage and current at the lithium ion battery device 1000, arithmetic operations of the state of charge (SOC), the state of health (SOH), and the like of the lithium ion battery device 1000, measurement of temperature of each of the battery blocks, output of a command to the cell controller 200 (for example, a command to measure the voltage at each of the lithium ion battery cells, a command to adjust the stored charge at each of the lithium ion battery cells, and the like), and the like.

Figure 9:
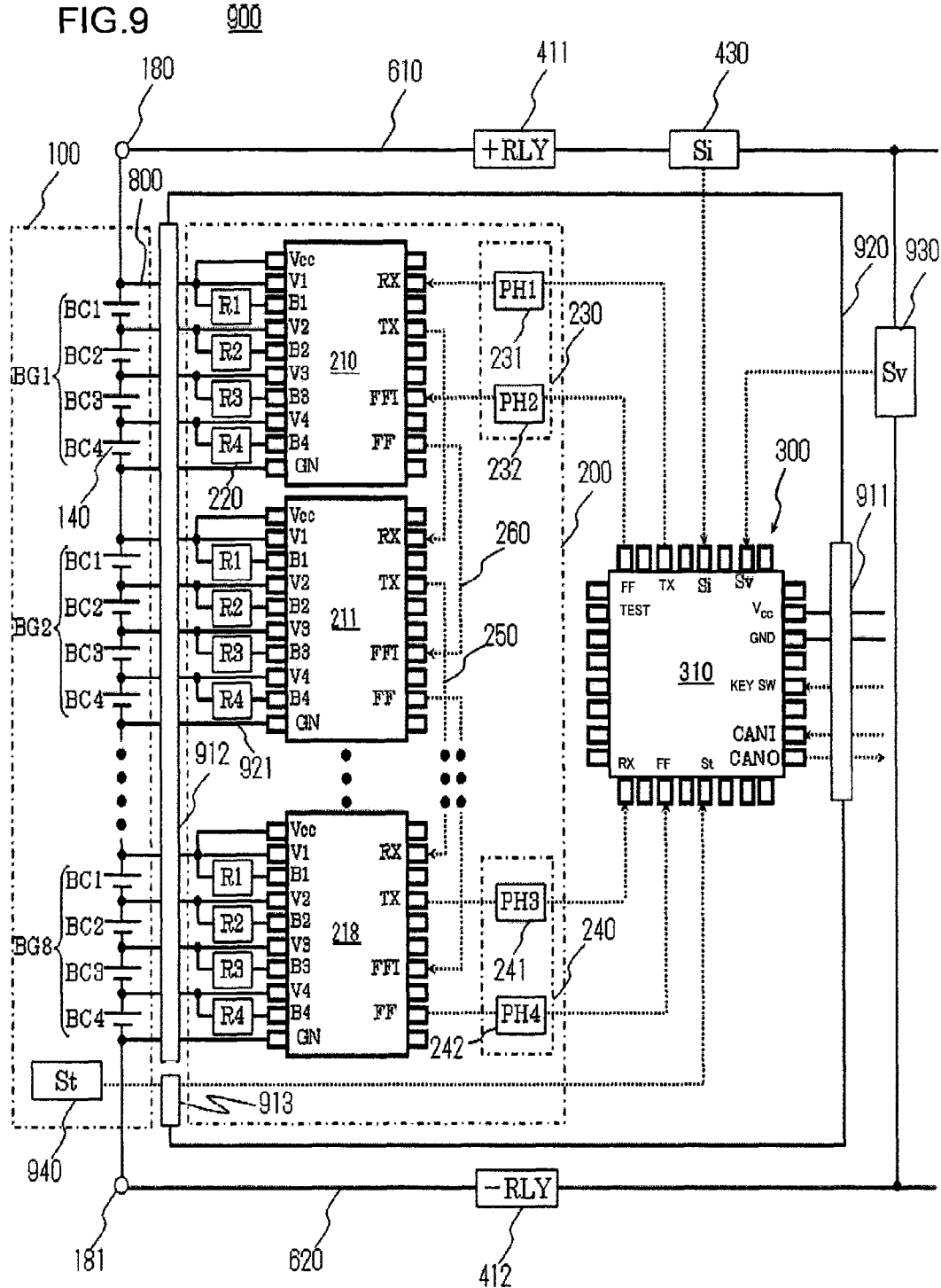
FIG. 9 is a circuit block diagram showing the structure of a control device constituting the lithium ion battery device.

In response to a command from the battery controller 300, the cell controller 200 manages and controls the state of the plurality of lithium ion battery cells, what is called hand and foot of the battery controller 300, and is constituted with a plurality of integrated circuits (IC) (refer to FIG. 9). The manage and control of the state of the plurality of lithium ion battery cells include measurement of the voltage at each of the lithium ion battery cells, adjustment of the stored charge at each of the lithium ion battery cells, and the like. Each of the integrated circuits is designated to a plurality of corresponding lithium ion battery cells, and manages and controls the state of the plurality of corresponding lithium ion battery cells.

The power source of the battery controller 300 uses a battery for auxiliaries (in case of an automobile, a lead acid battery with a nominal output voltage of 12V) that is installed as a power source system for on-vehicle auxiliaries, for instance, lights and audio equipment. For this reason, voltage (for instance, 12V) is applied from the battery for auxiliaries to the battery controller 300. The battery controller 300 steps down (for example, steps down to 5V) the applied voltage using a power source circuit constituted with a DC-DC power converter and applies the stepped down voltage to electronic components that constitute the battery controller 300 as a drive voltage. As a result, the electronic components that constitute the battery controller 300 operate.

The plurality of corresponding lithium ion battery cells are used as a power source of the integrated circuits that constitute the cell controller 200. For this reason, the cell controller 200 and the battery module 100 are electrically connected with each other through a connecting wire 800. Voltage on the highest potential at the plurality of corresponding lithium ion battery cells is applied to each of the integrated circuits through the connecting wire 800. Each of the integrated circuits steps down the applied voltage using the power source circuit (for example, steps down to 5V) and uses it as an operational power source.

A signal having been output from an ignition key switch is input to the battery controller 300. The signal having been output from the ignition key switch is used as a signal of start-up and shutdown of the lithium ion battery device 1000.

When the ignition key switch enters the ON state, in the battery controller 300, in response to an output signal from the ignition key switch, the power source circuit operates, and a drive voltage is applied from the power source circuit to a plurality of electronic circuit components so that the plurality of electronic circuit components operate. As a result, the battery controller 300 starts up. When the battery controller 300 starts up, a start-up command is output from the battery controller 300 to the cell controller 200. In the cell controller 200, in response to the start-up command from the battery controller 300, the power source circuits of the plurality of integrated circuits operate in sequence and the plurality of integrated circuits start up in sequence. As a result, the cell controller 200 starts up. When the cell controller 200 starts up, predetermined initial processing is executed and the lithium ion battery device 1000 starts up.

The predetermined initial processing includes, for instance, measurement of the voltage at each of the lithium ion battery cells, an abnormality diagnosis, measurement of the voltage and the current at the lithium ion battery device 1000, measurement of the temperature at each of the battery blocks, arithmetic operations the state of charge and the state of health of the lithium ion battery device 1000, arithmetic operations of the limit charge and discharge electric power of the lithium ion battery device 1000, and the like.

When the ignition key switch enters the OFF state, a stop command is output from the battery controller 300 to the cell controller 200. When the cell controller 200 receives the stop command, predetermined termination processing is executed, and then the power source circuits of the plurality of integrated circuits stop in sequence and the plurality of integrated circuits stop in sequence. As a result, the cell controller 200 stops. When the cell controller 200 stops and a communication with the cell controller 200 is blocked, in the battery controller 300, the operations of the power source circuits stop and the operations of the plurality of electronic circuit components stop. As a result, the battery controller 300 stops and the lithium ion battery device 1000 stops.

The predetermined termination processing includes, for instance, measurement of the voltage at each of the lithium ion battery cells, adjustment of the stored charge at each of the lithium ion battery cells, and the like.

On-vehicle local area network communication is used for transmission of information between the battery controller 300 and higher-order control devices such as the vehicle controller 30 and the motor controller 23. Local interconnect network communication, which conforms to the on-vehicle local area network communication, is used for transmission of information between the battery controller 300 and the cell controller 200.

A positive-pole terminal of the higher potential battery block 100a and the DC positive pole-side external terminal of the inverter device 20 are electrically connected through a positive pole-side power cable 610. A negative-pole terminal of the lower potential battery block 100b and the DC negative pole-side external terminal of the inverter device 20 are electrically connected through a negative pole-side power cable 620.

A junction box 400 is provided along the power cable 600. A relay mechanism constituted with a main relay 410 and a pre-charge circuit 420 is housed within the junction box 400. The relay mechanism is a closure portion to electrically allow conduction and block between the battery module 100 and the inverter device 20, in other words, the relay mechanism allows conduction between the battery module 100 and the inverter device 20 at the start-up of the on-vehicle electrical machine system while it allows block between the battery module 100 and the inverter device 20 at the time of stop and in the event of an abnormality of the on-vehicle electrical machine system. The relay mechanism controls between the lithium ion battery device 1000 and the inverter device 20 so as to ensure a high level of safety of the on-vehicle electrical machine system.

The drive of the relay mechanism is controlled by the motor controller 23. Upon reception of a report of start-up completion of the lithium ion battery device 1000 from the battery controller 300, the motor controller 23 outputs a conduction command signal to the relay mechanism at the start-up of the on-vehicle electrical machine system so as to drive the relay mechanism. Upon reception of an OFF output signal from the ignition key switch at the time of stop of the on-vehicle electrical machine system, and upon reception of an abnormality signal from the vehicle controller 30 in the event of an abnormality of the on-vehicle electrical machine system, the motor controller 23 outputs a block command signal to the relay mechanism so as to drive the relay mechanism.

The main relay 410 is constituted with a positive pole-side main relay 411 and a negative pole-side main relay 412. The positive pole-side main relay 411 is provided along the positive pole-side power cable 610 and controls an electrical connection between a positive pole-side of the lithium ion battery device 1000 and a positive pole-side of the inverter device 20. The negative pole-side main relay 412 is provided along the negative pole-side power cable 620 and controls an electrical connection between a negative pole-side of the lithium ion battery device 1000 and a negative pole-side of the inverter device 20.

The pre-charge circuit 420 is a series circuit in which a pre-charge relay 421 and a resistor 422 are electrically connected in series, and is electrically connected in parallel to the positive pole-side main relay 411.

At the start-up of the on-vehicle electrical machine system, the negative pole-side main relay 412 is turned on and then the pre-charge relay 421 is turned on. As a result, the current supplied from the lithium ion battery device 1000 is regulated by the resistor 422 and then is supplied to the smoothing capacitor 24 and charged. After the smoothing capacitor 24 is charged up to a predetermined voltage, the positive pole-side main relay 411 is turned on and the pre-charge relay 421 is released. As a result, the main current is supplied from the lithium ion battery device 1000 to the inverter device 20 via the positive pole-side main relay 411, and the main current becomes equal to or less than the limit current at the positive pole-side main relay 411 and the smoothing capacitor 24. Accordingly, the smoothing capacitor 24 and the positive pole-side main relay 411 may be protected from a large current at the start-up of the on-vehicle electrical machine system without occurring abnormalities such as a large initial current flowing in momentarily from the lithium ion battery device 1000 to the inverter device 20 due to the substantially zero electrical charge at the smoothing capacitor 24, significant heat generated at this time that may damage the smoothing capacitor 24, and the fixed and moving contacts of the positive pole-side main relay 411 that may become fused.

A current sensor 430 is housed inside the junction box 400. The current sensor 430 is provided to detect current supplied from the lithium ion battery device 1000 to the inverter device 20. An output line of the current sensor 430 is electrically connected to the battery controller 300. In response to a signal having been output from the current sensor 430, the battery controller 300 detects the current supplied from the lithium ion battery device 1000 to the inverter device 20. The current detection information is reported from the battery controller 300 to the motor controller 23, the vehicle controller 30, and the like. The current sensor 430 may be provided outside the junction box 400. A current detection section of the lithium ion battery device 1000 may be on the battery module 100 side of the positive pole-side main relay 411, as well as on the inverter device 20 side of the positive pole-side main relay 411.

It is to be noted that a voltage sensor 930 (refer to FIG. 9) to detect the voltage at the lithium ion battery device 1000 may be housed inside the junction box 400. An output line of the voltage sensor 930 is, similar to that of the current sensor 430, electrically connected to the battery controller 300. In response to an output signal from the voltage sensor 930, the battery controller 300 detects the overall voltage at the lithium ion battery device 1000. The voltage detection information is reported to the motor controller 23 and the vehicle controller 30. A voltage detection section of the lithium ion battery device 1000 may be on either the battery module 100 side or the inverter device 20 side of the relay mechanism.

A positive pole-side capacitor 500 is electrically connected between the positive pole-side power cable 610 and a case ground (assuming a potential equal to that at the vehicle chassis) of the lithium ion battery device 1000. A negative pole-side capacitor 510 is electrically connected between the negative pole-side power cable 620 and a case ground (assuming a potential equal to that at the vehicle chassis) of the lithium ion battery device 1000. The positive pole-side capacitor 500 and the negative pole-side capacitor 510 are installed in order to prevent erroneous operation of the battery controller 300 and the cell controller 200, low-rate electrical circuits, and destruction of the integrated circuit (IC) constituting the cell controller 200 due to a surge voltage, by eliminating noise generated via the inverter device 20. While the inverter device 20 includes a noise removal filter, the positive pole-side capacitor 500 and the negative pole-side capacitor 510 are installed so as to even more effectively prevent erroneous operations of the battery controller 300 and the cell controller 200, low-rate electrical circuits, and destruction of the integrated circuit (IC) constituting the cell controller 200 due to a surge voltage, and improve the noise withstanding reliability of the lithium ion battery device 1000.

Figure 3:
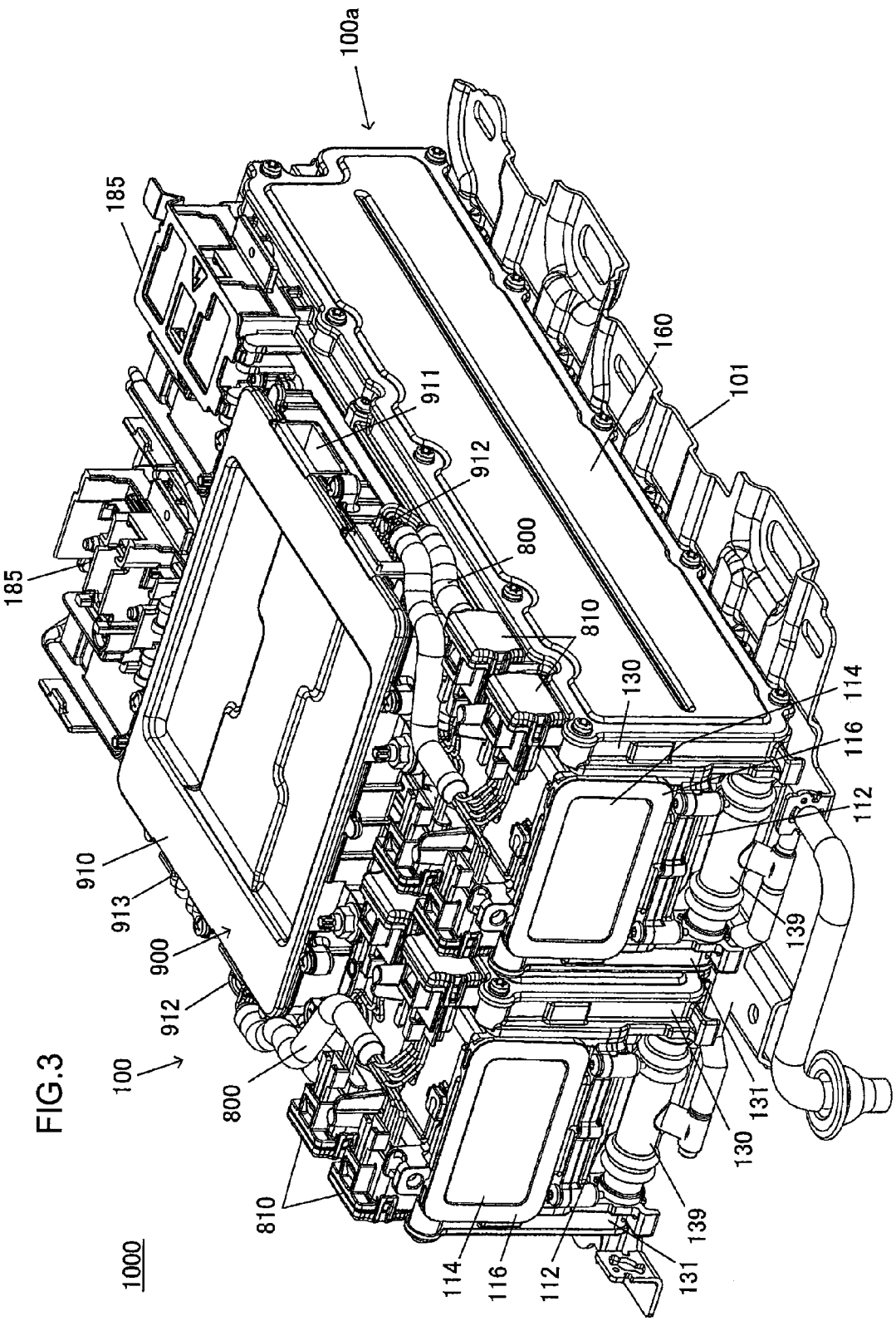
FIG. 3 is a perspective view of the lithium ion battery device shown in FIG. 2, seen from the cooling medium inlet side.
Figure 4:
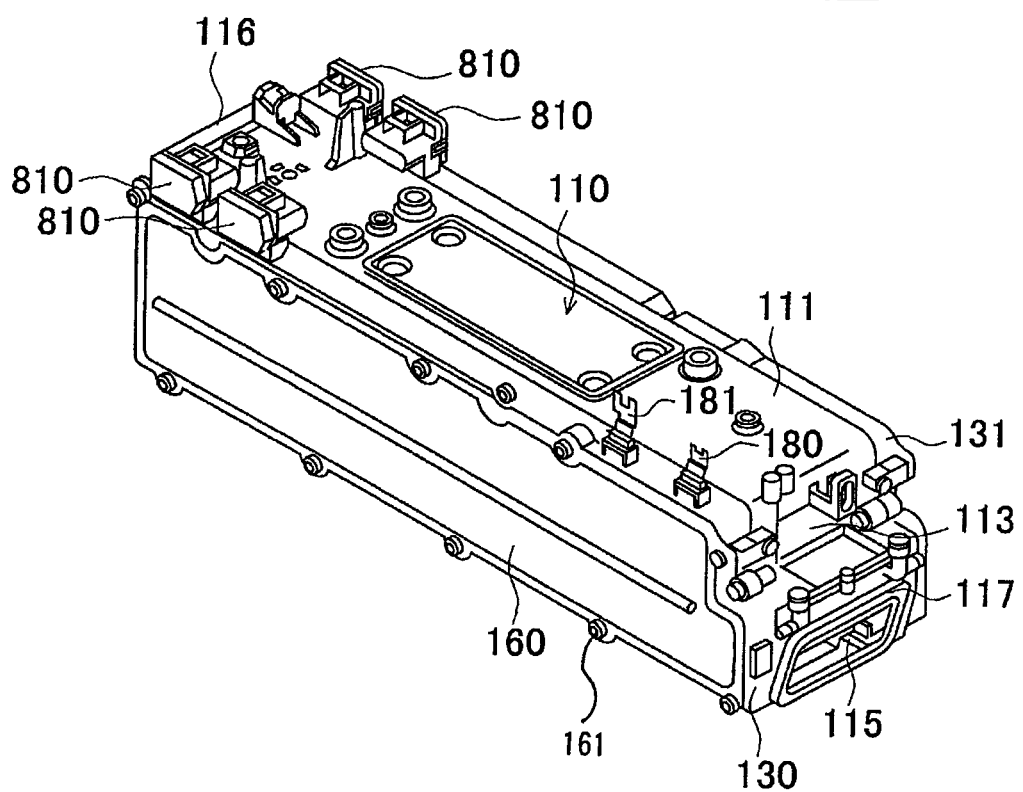
FIG. 4 is a perspective view showing the external appearance structure of a whole battery block of a battery module constituting the lithium ion battery device according to the embodiment.
Figure 5:
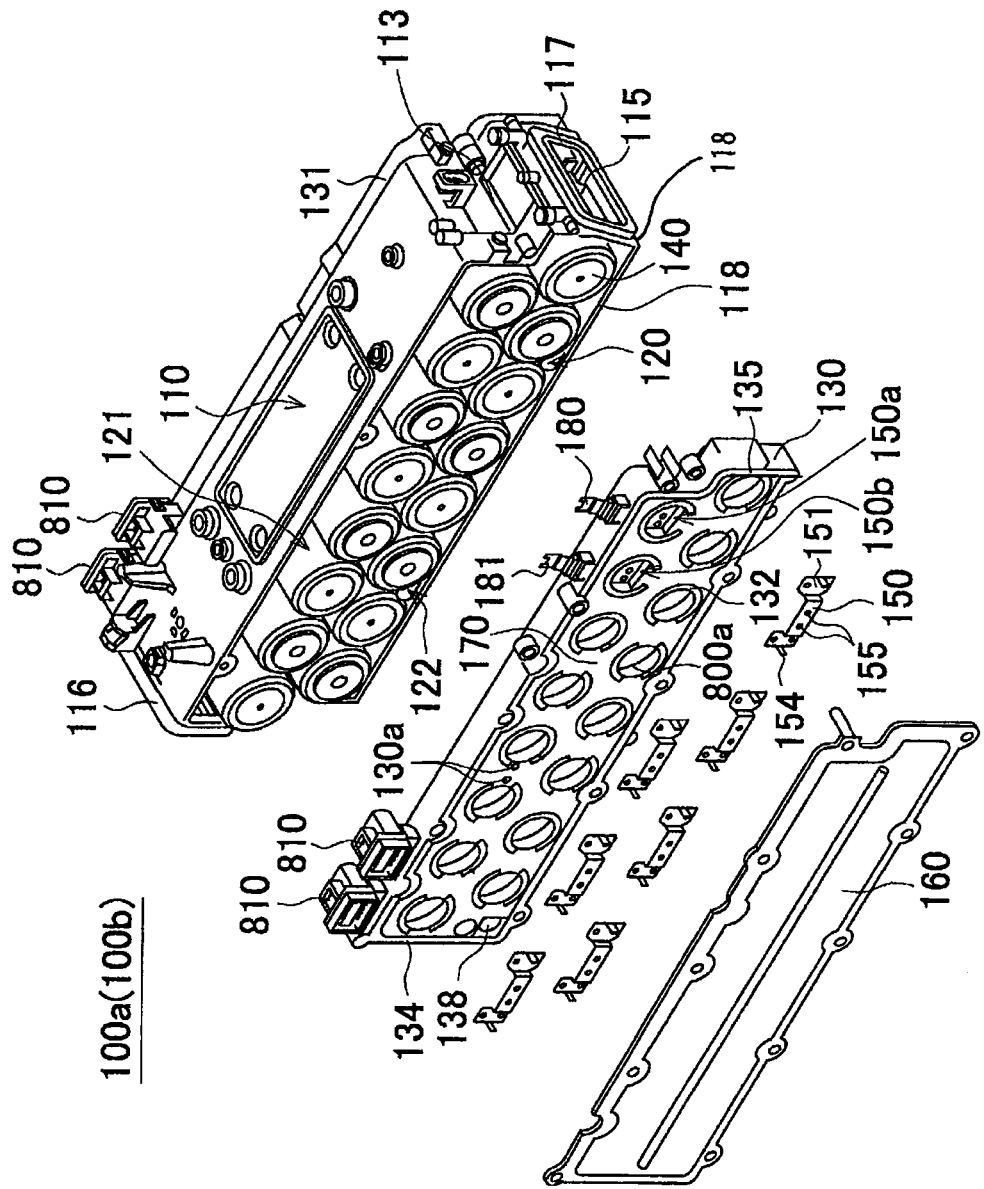
FIG. 5 is an exploded perspective view of the battery block shown in FIG. 4.

Next, the structure of the lithium ion battery device 1000 will be explained in reference to FIG. 2 to FIG. 8. FIGS. 2 and 3 show perspective views presenting the overall structure of the lithium ion battery device 1000. FIG. 4 shows a perspective view of the battery block that constitutes the lithium ion battery device 1000, and FIG. 5 shows an exploded perspective view of the battery block shown in FIG. 4.

The lithium ion battery device 1000 is constituted with two main units of the battery module 100 and the control device 900. The structure of the battery module 100 will now be explained.

As described above, the battery module 100 is constituted with the higher potential battery block 100a and the lower potential battery block 100b, and the two battery blocks 100a and 100b are electrically connected in series. It is to be noted that the higher potential battery block 100a and the lower potential battery block 100b include exactly the same structure. Therefore, FIGS. 4 and 5 include only the higher potential battery block 100a as a representative example of the higher potential battery block 100a and the lower potential battery block 100b, and do not include an explanation of the detailed structure of the lower potential battery block 100b.

As shown in FIG. 2, the higher potential battery block 100a and the lower potential battery block 100b are adjacently disposed in parallel with each other so that longitudinal directions of each of the blocks are in parallel. The higher potential battery block 100a and the lower potential battery block 100b are juxtaposed on a module base 101 and fixed with a fixing means such as a bolt. The module base 101 is constituted with a rigid, thin-wall metal plate (for example, a steel plate) that is divided into three in a transverse direction, and is fixed to the vehicle. In other words, the module base 101 is constituted with three members disposed on the both ends and the middle section in the transverse direction. By adopting this structure, the surface of the module base 101 can be flush with the lower surface of each of the battery blocks 100a and 100b, and the dimension of the battery module 100 in the height direction can be further reduced.

The upper portions of the higher potential battery block 100a and the lower potential battery block 100b are fixed with a casing 910 of the control device 900 described below.

As shown in FIG. 5, the higher potential battery block 100a is mainly constituted with a casing 110 (may instead be called as casing, housing, or package) and a battery assembly 120. The battery assembly 120 is housed and held inside the casing 110.

The casing 110 constitutes a substantially rectangular block casing. More specifically, it is constituted with a combination of six members, i.e., an inlet channel forming plate 111, an outlet channel forming plate 118, an inlet-side guide plate 112, an outlet-side guide plate 113, and two side plates 130 and 131. The interior space of the casing 110 functions as a housing chamber in which the battery assembly 120 is housed and also functions as a cooling channel through which a cooling medium (cooling air) flows to cool down the battery assembly 120.

It is to be noted that in the explanation provided below, a direction with the longest dimension of the casing 110 and a direction from a cooling medium inlet 114 side to a cooling medium outlet 115 side are defined as longitudinal directions. A direction in which two side surfaces (the two side plates 130 and 131) different from the two side surfaces (the inlet-side guide plate 112 and the outlet-side guide plate 113) that face each other in the longitudinal direction of the casing 110 face each other, a central axial direction of a lithium ion battery cell 140 (a direction in which two electrodes of the positive-pole terminal and the negative-pole terminal face each other), and a direction in which a conductive member 150, which electrically connects two of the lithium ion battery cells 140, and the two of the lithium ion battery cells 140 face each other are defined as transverse directions. In addition, a direction in which the inlet channel forming plate 111 and the outlet channel forming plate 118 face each other is defined as a height direction regardless of setting direction of the battery module 100.

The inlet channel forming plate 111 is a rectangular flat plate that forms the upper surface of the casing 110. The outlet channel forming plate 118 is a flat plate that forms the bottom surface of the casing 110. The inlet channel forming plate 111 and the outlet channel forming plate 118 are displaced with respect to each other in the longitudinal direction. As a result, the positions of end of the inlet channel forming plate 111 and end of the outlet channel forming plate 118 are displaced with respect to each other in the longitudinal direction. The inlet channel forming plate 111 and the outlet channel forming plate 118 are constituted with rigid, thin-wall metal plates.

The inlet-side guide plate 112 is a plate-like member that forms one side of the side surfaces facing the longitudinal direction of the casing 110. The outlet-side guide plate 113 is a plate-like member that forms the other side of the side surfaces facing the longitudinal direction of the casing 110. The inlet-side guide plate 112 and the outlet-side guide plate 113 are constituted with rigid, thin-wall metal plates.

The cooling medium inlet 114 that constitutes an inlet via which cooling air, which is a cooling medium, is led into the casing 110 is formed between the inlet channel forming plate 111 and the inlet-side guide plate 112. The cooling medium inlet 114 is provided with a cooling medium inlet duct 116 to lead cooling air to the cooling medium inlet 114. As described above, the inlet channel forming plate 111 and the outlet channel forming plate 118 are displaced with respect to each other, and the inlet-side end of the casing 110 is formed in steps. As a result, a space is formed in the longitudinal direction between the cooling medium inlet 114 and the inlet-side guide plate 112. A gas outlet pipe 139 that will be described later is housed in this space. As shown in FIG. 3, the inlet-side guide plate 112 is disposed at the back of the gas outlet pipe 139. By adopting this structure, the dimension of the battery module 1000 can be reduced in the longitudinal direction. The cooling medium outlet 115 that constitutes an outlet via which cooling air is led from inside the casing 110 is formed between the outlet channel forming plate 118 and the outlet-side guide plate 113. The cooling medium outlet 115 is provided with a cooling medium outlet duct 117 to lead cooling air from the cooling medium outlet 115 to the exterior.

The positions of the cooling medium inlet 114 and the cooling medium outlet 115 are displaced in the height direction (the direction in which the inlet channel forming plate 111 and the outlet channel forming plate 118 face each other). In other words, the cooling medium inlet 114 is located on the inlet channel forming plate 111 side, and the cooling medium outlet 115 is located on the outlet channel forming plate 118 side.

In view of assembling efficiency of the battery blocks, the inlet channel forming plate 111, the outlet-side guide plate 113, the cooling medium inlet 114, and the cooling medium inlet duct 116 are integrally formed, and the outlet channel forming plate 118, the inlet-side guide plate 112, the cooling medium outlet 115, and the cooling medium outlet duct 117 are integrally formed.

The inlet channel forming plate 111, the outlet channel forming plate 118, the inlet-side guide plate 112, the outlet-side guide plate 113, the cooling medium inlet 114, and the cooling medium outlet 115 and the side plates 130 and 131 are connected by a fixing means such as screws, bolts, or rivets. A sealing member (not shown) is provided between connection members of those connection sections so as to improve air tightness inside the casing 110 and allow the cooling medium having been led to inside the casing 110 via the cooling medium inlet 114 to be discharged via the cooling medium outlet 115 without leaking out.

The side plates 130 and 131 are flat plate-like members that form two side surface that face the casing 110 in the transverse direction, and are moldings made of a resin such as PBT that has electrical insulation properties. The wall thicknesses of the side plates 130 and 131 are greater than those of the inlet channel forming plate 111, the outlet channel forming plate 118, the inlet-side guide plate 112, and the outlet-side guide plate 113. The detailed structures of the side plates 130 and 131 will be described later.

A cover member 160, which is called as a side cover, is provided outside the side plates 130 and 131, i.e., on the opposite side of the housing chamber of the battery assembly 120. While only the cover member 160 provided outside the side plate 130 is illustrated in FIG. 5, the cover member 160 is provided outside the side plate 131 as well. The cover member 160 is fixed to the side plate 130 by a fixing means 161 such as bolts or rivets.

The cover plate 160 is a flat plate prepared by pressing a metal plate of steel, aluminium, or the like, or a flat plate prepared by molding a resin of PBT or the like, and assumes substantially the same structure of that of the planar shape of the side plate 130. The cover plate 160 has a region that includes a section corresponding to through-holes 132 of the side plate 130 that are described later evenly bulging opposite to the side plate 130. As a result, a space is formed between the cover plate 160 and the side plate 130. This space functions as a gas release chamber (or a gas release channel) through which mist gas having been emitted from the lithium ion battery cells 140 is released separately from the cooling medium that flows through the cooling channel.

The battery assembly 120 is an assembly (lithium ion battery cell group) of a plurality of lithium ion battery cells 140. The plurality of lithium ion battery cells 140 are aligned and housed in the housing chamber formed inside the casing 110, sandwiched by the side plates 130 and 131 from the transverse direction, and electrically connected in series by connecting with the plurality of conductive members 150 called busbars.

The lithium ion battery cells 140 assume a structure in columnar shape, constituted with component parts such as a cell element and a safety valve being housed inside a battery case in which electrolytic solution has been injected. A positive pole-side safety valve is a split valve that splits when the pressure inside the battery case becomes a predetermined pressure due to an abnormality such as over-charge. The safety valve functions as a fuse mechanism that blocks the electrical connection between a battery lid and the positive pole-side of the cell element by splitting, and functions as a decompression mechanism that emits gas generated inside the battery case, i.e., mist carbon dioxide gas (the jet) including electrolytic solution, to outside the battery case.

The negative pole-side of the battery case is also provided with a split groove, which splits when the pressure inside the battery case becomes a predetermined pressure due to an abnormality such as over-charge. This allows the gas generated inside the battery case to be emitted from the negative-pole terminal side as well. The nominal output voltage of the lithium ion battery cell 140 is 3.0 to 4.2V and the average nominal output voltage is 3.6V.

The embodiment assumes the battery assembly 120 constituted by aligning and disposing sixteen of the cylindrical lithium ion battery cells 140 inside the casing 110. More specifically, in the state in which the lithium ion battery cells 140 are placed on their sides so that the central axes of the lithium ion battery cells 140 extend along the transverse direction, eight of the lithium ion battery cells 140 are disposed in parallel so as to constitute a first battery cell array 121. In addition, similar to the first battery cell array 121, eight of the lithium ion battery cells 140 are disposed so as to constitute a second battery cell array 122. The battery assembly 120 is constituted by layering (by stacking them straight or layering them with an offset) the first battery cell array 121 and the second battery cell array 122 in the height direction. In other words, the battery assembly 120 is constituted by arranging the lithium ion battery cells 140 with eight arrays in the longitudinal direction and two stacks or two layers in the height direction.

The first battery cell array 121 and the second battery cell array 122 are displaced with respect to each other in the longitudinal direction. In other words, the first battery cell array 121 is disposed on the inlet channel forming plate 111 side with respect to the second battery cell array 122, and displaced towards the cooling medium inlet 114 side. On the other hand, the second battery cell array 122 is disposed on the outlet channel forming plate side with respect to the first battery cell array 121, and displaced towards the cooling medium outlet 115 side. As shown in FIG. 5, the embodiment assumes the first battery cell array 121 and the second battery cell array 122 displaced with respect to each other in the longitudinal direction so that, for instance, the longitudinal position of the central axis of one of the lithium ion battery cells 140 lying closest to the cooling medium outlet 115 in the first battery cell array 121 lies between the central axis of one of the lithium ion battery cells 140 lying closest to the cooling medium outlet 115 in the second battery cell array 122 and the central axis of the lithium ion battery cells 140 adjacent thereto.

The lithium ion battery cells 140 that constitute the first battery cell array 121 are juxtaposed so as to alternate the directions of the terminals thereof. The lithium ion battery cells 140 that constitute the second battery cell array 122 are also juxtaposed so as to alternate the directions of the terminals thereof. However, the sequence from the cooling medium inlet 114 side to the cooling medium outlet 115 side of the terminals of the lithium ion battery cells 140 that constitute the first battery cell array 121 is different from that of the terminals of the lithium ion battery cells 140 that constitute the second battery cell array 122. In other words, in the first battery cell array 121, the lithium ion battery cells 140 are disposed so that the terminals thereof facing the side plate 130 are arranged in order of the negative-pole terminal, the positive-pole terminal, the negative-pole terminal, . . . , the positive-pole terminal from the cooling medium inlet 114 side to the cooling medium outlet 115 side. On the other hand, in the second battery cell array 122, the lithium ion battery cells 140 are disposed so that the terminals thereof facing the side plate 130 are arranged in order of the positive-pole terminal, the negative-pole terminal, the positive-pole terminal, . . . , the negative-pole terminal from the cooling medium inlet 114 side to the cooling medium outlet 115 side.

Thus, by disposing the first battery cell array 121 and the second battery cell array 122 displaced in the longitudinal direction, the dimension of the battery assembly 120 in the height direction can be reduced and the higher potential battery block 110a can be downsized in the height direction.

Next, the structure of the side plates 130 and 131 that sandwich the battery assembly 120 will be explained in detail. While the explanation will be given with respect to the structure of only the side plate 130 for ease of comprehension, the side plate 131 is configured basically the same as the side plate 130.

However, a battery module side connection terminal 180 that is electrically connected to the positive pole-side of the battery assembly 120 and a battery module side connection terminal 181 that is electrically connected to the negative pole-side of the battery assembly 120 are provided only on the side plate 130. The connection terminals 180 and 181 are aligned in the longitudinal direction on the upper surface of the side plate 130, i.e., on the surface of the inlet channel forming plate 111 side. A DC positive pole-side input/output terminal 183 and a negative pole-side input/output terminal 184, which have been formed as a subassembly 185 separately from the battery module 100, are connected to the connection terminals 180 and 181, respectively. A terminal of the positive pole-side power cable 610 is connected to the positive pole-side input/output terminal 183 of the higher potential battery block 110*a*, and a terminal of a cable that is electrically connected to one end of the SD switch 700 is connected to the negative pole-side input/output terminal 184 (refer to FIG. 1). A terminal of a cable that is electrically connected to the other end of the SD switch 700 is connected to the positive pole-side input/output terminal 183 of the lower potential battery block 110*b*. A terminal of the negative pole-side power cable 620 is connected to the negative pole-side input/output terminal 184 of the lower potential battery block 110*b*. It is to be noted that in FIG. 2, the subassembly 185 of the higher potential battery block 100*a* represents the state in which it is covered with a terminal cover, while the subassembly 185 of the lower potential battery block 100*b* represents the state in which the terminal cover is removed.

As shown in FIG. 5, the side plate 130 is formed in a substantially rectangular flat plate. Sixteen round through-holes 132 that penetrate in the transverse direction are formed on the side plate 130. The sixteen through-holes 132 are disposed in line with the sixteen lithium ion battery cells 140 so as to open corresponding to the electrode positions of the sixteen lithium ion battery cells 140 aligned as described earlier. Accordingly, when the battery assembly 120 is housed in the casing 110, the sixteen through-holes 132 of the side plate 130 are closed with a terminal surface on one end of the sixteen lithium ion battery cells 140, and the sixteen through-holes 132 on the side plate 131 are closed with a terminal surface on the other end of the sixteen lithium ion battery cells 140.

A protruding section 133 is formed partially encompassing the through-holes 132 on an outer wall surface 170 of the side plate 130, which is opposite an inner wall surface with which the housing chamber of the battery assembly 120 is formed. In addition, a plurality of fixed guides 130*a* are formed so as to dispose the conductive members 150 connected to the lithium ion battery cell 140 between the through-holes 132 on the outer wall surface 170. The protruding section 133 and the fixed guides 130*a* each protrude from the outer wall surface 170 so as to prevent the cover member 160 and the conductive members 150 from contacting each other. As a result, if the cover member 160 is constituted with, for instance, a flat metal plate such as steel, the cover member 160 and the conductive members 150 can be prevented from short circuiting.

The side plate 130 is provided with a gas discharge channel 138 through which the gas (mixture gas with fluid including electrolytic solution) having been released to the gas release chamber between the side plate 130 and the cover member 160 is discharged outside the higher potential battery block 100*a*. An opening section of the gas discharge channel 138 is formed on a lower part of the side plate 130 in view of discharge of fluid such as electrolytic solution included in the gas, more specifically, on the cooling medium inlet 114 side and on the outlet channel forming plate 118 side of the side plate 130. A front end section of the gas discharge channel 138 is formed in a pipe-like shape, and connected to the gas outlet pipe 139 (refer to FIG. 3) through which the gas having been discharged through the gas discharge channel 138 is led out.

Two connection terminals 810 are aligned in the longitudinal direction on the upper surface of the side plate 130, i.e., the surface on the inlet channel forming plate 111 side. The connection terminals 810 are integrally formed on the side plate 130 with the same forming material as that of the side plate 130, and disposed on the upper surface of the side plate 130 towards the cooling medium inlet 114 side. Each of the connection terminals 810 includes a current block section 811 and electrically connects the wire (connecting line) 800 that extends from a voltage detection connector 912 of the control device 900 with a voltage detection conductor 805, which is described later, via the current block section 811. The voltage detection connectors 912 are each provided on the both ends in the transverse direction of the control device 900. The connecting wire 800 connected to the connection terminals 810 provided on the higher potential battery block 100*a* is connected to the connector 912 of the control device 900 disposed above the higher potential battery block 100*a*. On the other hand, the connecting wire 800 connected to the connection terminals 810 provided on the lower potential battery block 100*b* is connected to the connector 912 of the control device 900 disposed above the lower potential battery block 100*b*. In order to prevent erroneous wiring, the length of the connecting wire 800 is set so as to correspond to the length between each of the connection terminals 810 and the connectors 912 corresponding thereto. For example, the length of the connecting wire 800 connected to the connection terminals 810 of the higher potential battery block 100*a* is set so as not to reach the connector 912 of the lower potential battery block 100*b*. The current block section 811 includes a fuse wire to be fused in the event of an abnormality of the control circuit 900 and the wire 800 so as to block the current from the battery assembly 120 and protect the product.

Figure 6:
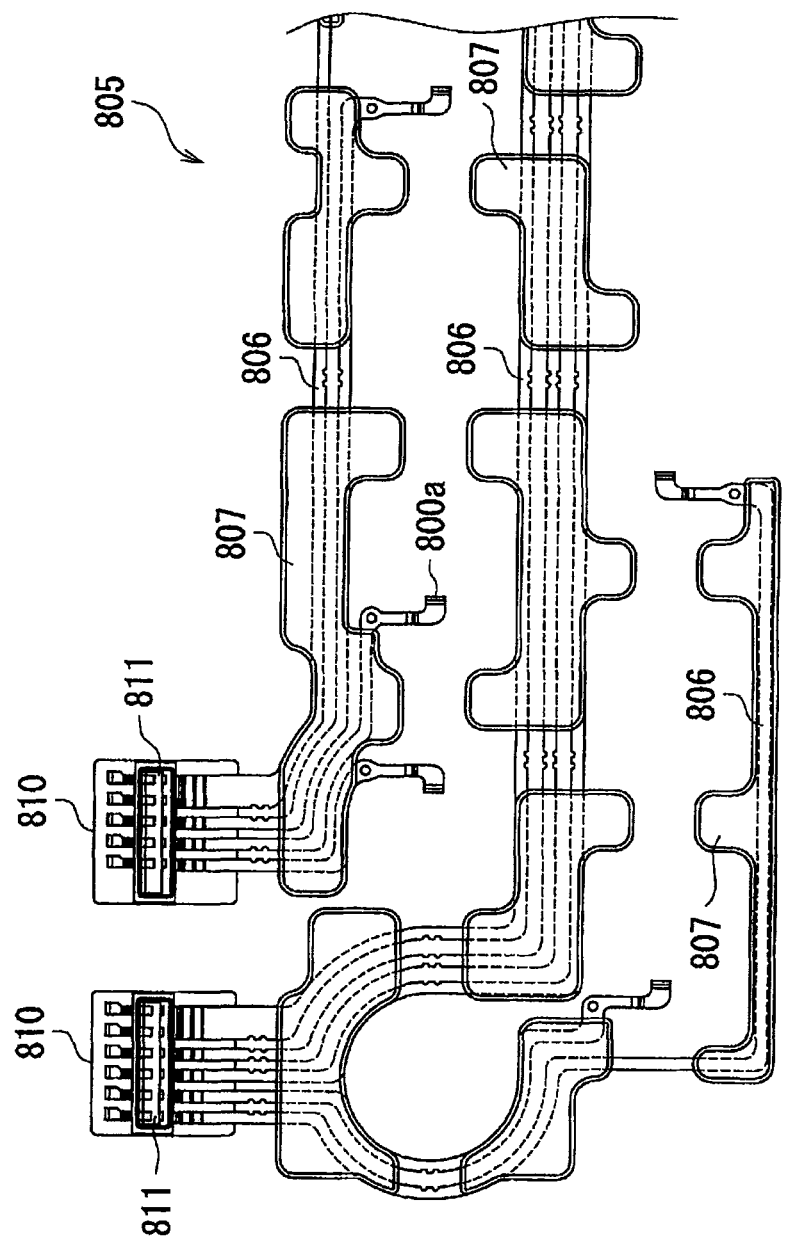
FIG. 6 illustrates the structure of a voltage detection conductor.
Figure 7:
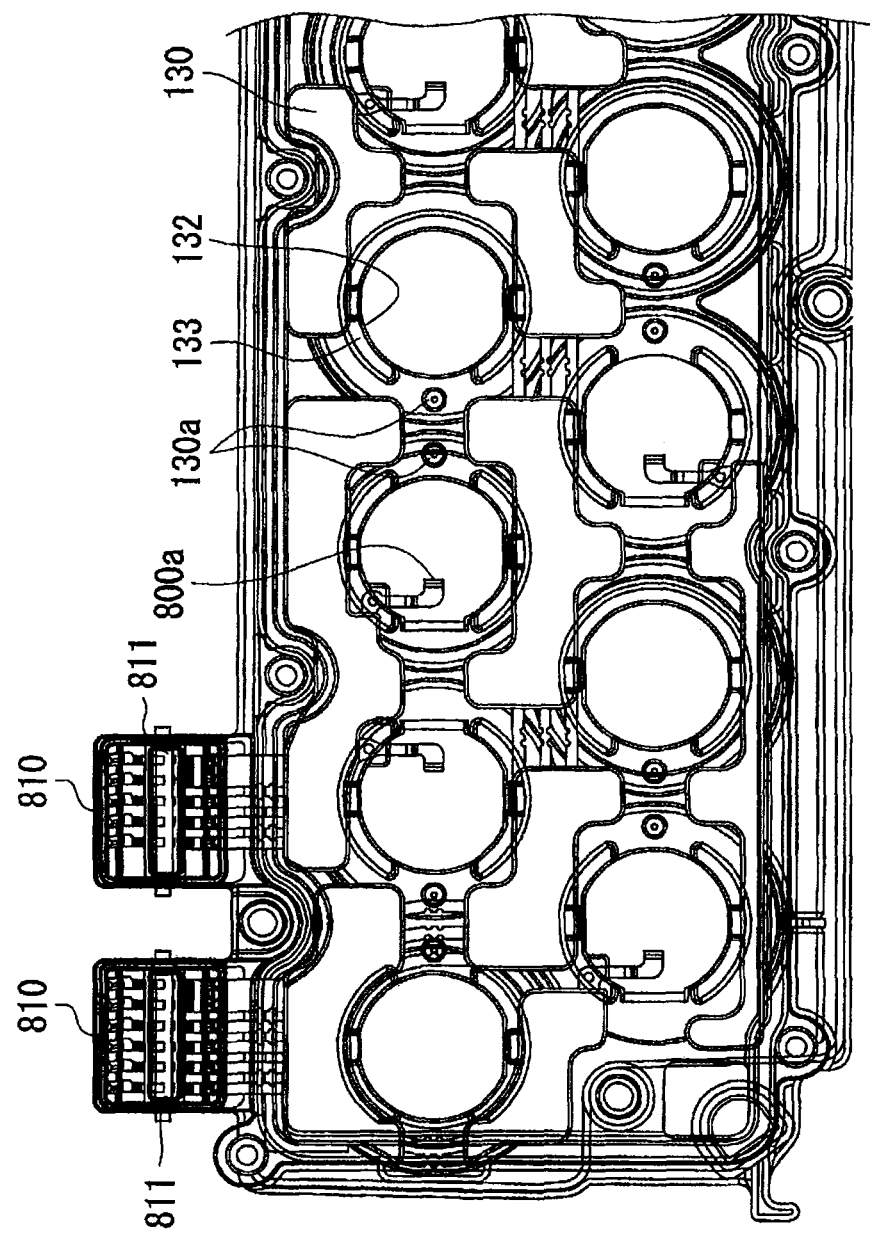
FIG. 7 illustrates the voltage detection conductor built in a side plate.

In order to detect the voltage at each of the plurality of lithium ion battery cells 140 constituting the battery assembly 120, the voltage detection conductor 805 is connected to the conductive members 150 that connect the lithium ion battery cell 140 in series. The voltage detection conductor 805 is integrated with the side plate 130, more specifically, built in the side plate 130. FIG. 6 illustrates an example of the shape of the voltage detection conductor 805, and FIG. 7 illustrates a state in which the voltage detection conductor 805 shown in FIG. 6 is built in the side plate 130.

In the voltage detection conductor 805, as shown in FIG. 6, elongated, rectangular wire-like detection lines 806 are formed by pressing a thin metal plate such as copper. The voltage detection conductor 805 assumes a structure in which the detection lines 806 extend so as not to protrude from the plurality of through-holes 132 formed on the side plate 130, and so that a front end section 800*a* of the detection line 806 is exposed through the predetermined through-hole 132. The front end section 800*a* is bent outward with respect to the housing chamber of the battery assembly 120 and connected to the conductive member 150. The other end of the voltage detection conductor 805, i.e., oppose the front end section 800*a*, is electrically connected to the connection terminals 810 via the current block section 811.

The shape of the voltage detection conductor 805 is designed so as to downsize the side plate 130 and the overall battery module 100 and so as to effectively use an available space of the side plate 130. Since the plurality of lithium ion battery cells 140 are connected in series via the conductive members 150, a potential difference occurs among the plurality of conductive members 150 connected to the voltage detection conductor 805. Therefore, in the voltage detection conductor 805, disposition of the detection lines 806 is determined so as to minimize the potential difference between the adjacent detection lines 806.

After being formed into a predetermined shape by pressing or the like, the voltage detection conductor 805 is fixed in shape by a resin section 807 made of the same resin as that of, for example, the side plate 130. More specifically, the plurality of detection lines 806 are each separated and fixed by the resin section 807 so as to maintain the shape of each of the detection lines 806. The voltage detection conductor 805 shown in FIG. 6 is constituted with two sub-units in which the detection lines 806 are fixed by the resin sections 807 at a plurality of sections.

As shown in FIG. 6, the voltage detection conductor 805 fixed with the resin sections 807 is integrally formed with the side plate 130 by, for example, insert molding with the resin constituting the side plate 130. Since the detection lines 806 are fixed separately from each other, when the voltage detection conductor 805 is integrally formed with the side plate 130, the short circuit does not substantially occur between the detection lines 806.

Figure 8:
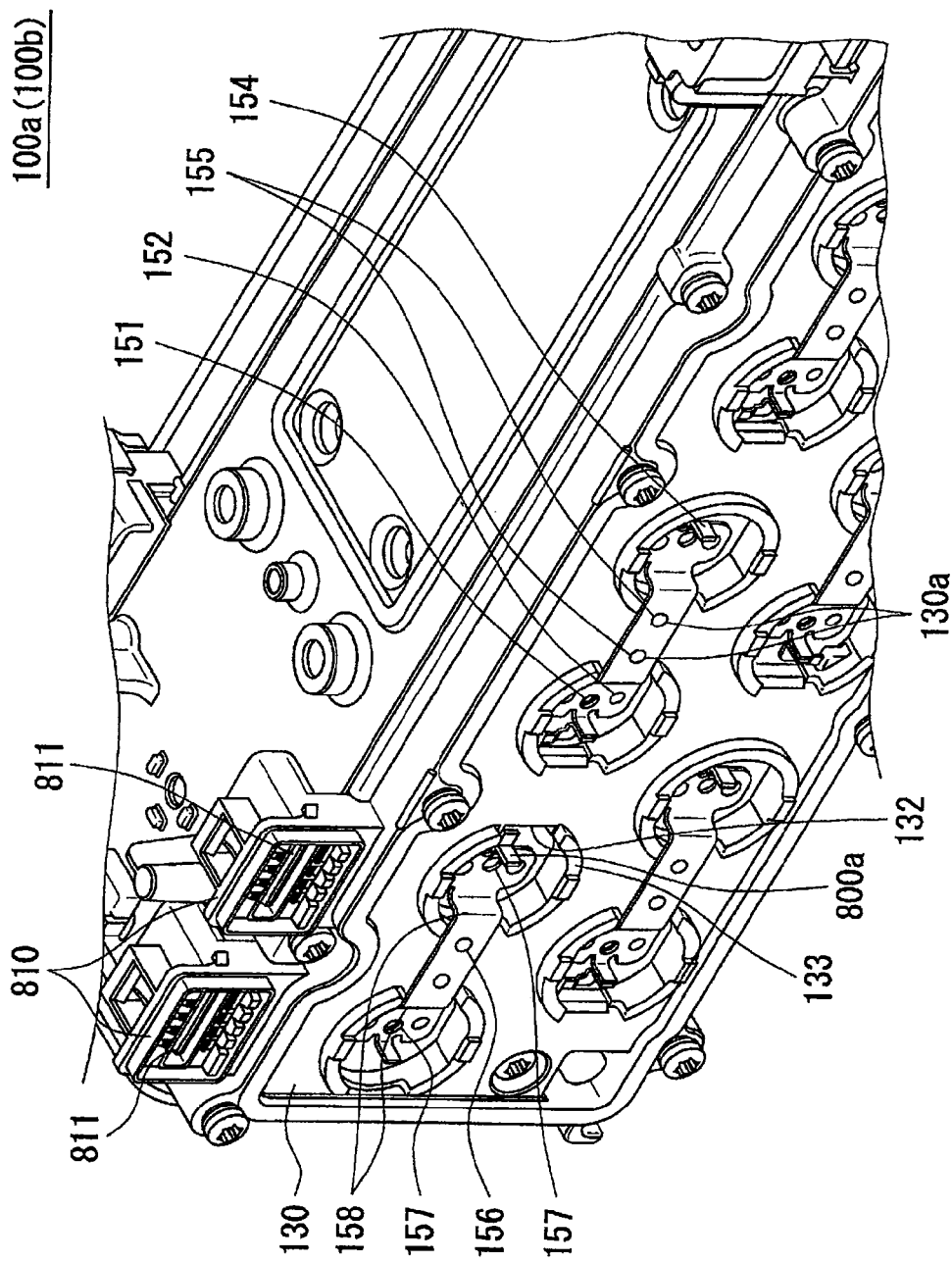
FIG. 8 is a perspective view of the battery block with conductive members mounted on the side plate.

FIG. 8 shows a partial perspective view of the higher potential battery block 100a in the state in which the conductive members 150 are mounted on the side plate 130 and connected to the lithium ion battery cells 140. The conductive members 150 are metal, for example copper, plate-like members that electrically connect between the lithium ion battery cells 140, and are constituted separately from the side plate 130. However, as shown in FIG. 5, the conductive member 150a having been integrally formed with the connection terminal 180 and the conductive member 150b having been integrally formed with the connection terminal 181 are integrally formed with the side plate 130.

The conductive members 150 are each constituted with a middle section 156 extending in strips and end sections 157 located on the both ends of the middle section 156. The middle section 156 and each of the end sections 157 merge with each other via a bend section 158. In other words, the conductive members 150 are bent and formed in steps. A round through-hole 151, joining sections 152 with the terminal surface of the lithium ion battery cell 140, and a welding section 154 connected to the front end section 800a of the voltage detection conductor 805 are formed on each of the end sections 157 of the conductive members 150. As described later, the through-hole 151 is provided so that the emitted gas passes through in the event that gas is emitted from the lithium ion battery cells 140. Two through-holes 155 are formed at the middle section 156 of the conductive members 150 so as to insert therethrough fixed guides 130a provided on the side plate 130.

The conductive members 150 are mounted on the side plate 130 so that the two through-holes 155 of the middle section 156 are fitted with the two fixed guides 130a provided on the side plate 130. When the conductive members 150 are mounted on the side plate 130, the both end sections 157 of the conductive members 150 penetrate into the through-holes 132 and abut against the terminal surfaces of the lithium ion battery cells 140. The welding sections 154 of the conductive members 150 abut against the front end sections 800a of the voltage detection conductor 805 exposed through the through-holes 132 formed on the side plate 130. It is to be noted that as shown in FIG. 7, due to the connection structure of the lithium ion battery cells 140, the front sections 800a are not exposed through some of the through-holes 132.

Next, the control device 900 constituting the lithium ion battery device 1000 will be explained in reference to FIG. 9.

The control device 900 is placed on the battery module 100. More specifically, the control device 900 is an electronic circuit device placed astride on the higher potential battery module 100a and the lower potential battery module 100b, which includes the casing 910 and a circuit board 920 housed inside the casing 910.

The casing 910 is a flat, cuboid-shaped metal box body, which is fixed to the higher potential battery module 100a and the lower potential battery module 100b by a fixing means such as bolts or screws. As a result, the higher potential battery module 100a and the lower potential battery module 100b are fixed by the control device 900 that connects the transverse ends between them. In other words, since the control device 900 functions also as a support member, the strength of the battery module 100 can be further improved.

Electronic circuit components constituting the cell controller 200 and electronic circuit components constituting the battery controller 300 are mounted on the circuit board 920. The circuit components constituting the cell controller 200 include eight integrated circuits (IC) 210 to 218 electrically connected to the corresponding lithium ion battery cell 140. The circuit components constituting the battery controller 300 include a microcomputer 310.

The cell controller 200 includes a plurality of resistors 220 and a plurality of circuit elements such as photocoupler units 230 and 240.

The resistors 220, being used to adjust amount of charge at the lithium ion battery cells 140, are consumption circuit elements that convert the current released from the lithium ion battery cells 140 into heat and consume it, and four of them (R1 to R4) are provided to each of the integrated circuits 210 to 218.

The photocoupler unit 230 is an interface circuit provided in a signal transmission path between the integrated circuit 210, which is the beginning end of the integrated circuits 210 to 218, and the microcomputer 310, and includes photocouplers 231 and 232, which are optically-isolated elements used to transmit and receive signals with a variety of potential levels. The photocoupler unit 240 is an interface circuit provided in a signal transmission path between the integrated circuit 218, which is the terminal end of the integrated circuits 210 to 218, and the microcomputer 310, and includes photocouplers 241 and 242, which are optically-isolated elements used to transmit and receive signals with a variety of potential levels.

A plurality of connectors are provided on side surfaces of the casing 910, i.e., the both end surfaces of the control device 900 in the transverse direction. The plurality of connectors include the voltage detection connectors 912, a temperature detection connector 913, and a connector 911 for external connections. Each of the voltage detection connectors 912 is coupled with connectors of the connecting wires 800 electrically connected to the thirty-two lithium ion battery cells 140. The temperature detection connector 913 is coupled with a connector of a signal line 941 of a plurality of temperature sensors 940 disposed inside the battery module 100.

The connector 911 for external connections is coupled with connectors (not shown) of a power source line through which drive power source is supplied to the battery controller 300, a signal line through which an ON/Off signal of the ignition key switch is input, a communication line through which communication with the vehicle controller 30 and the motor controller 23 is performed in controller area network (CAN), and the like.

The plurality of lithium ion battery cells 140 are assigned to a plurality of groups corresponding to each of the integrated circuits 210 to 218. In the embodiment shown in FIG. 9, the thirty-two lithium ion battery cells 140, i.e., the sum of the sixteen lithium ion battery cells 140 constituting the battery assembly 120 of the higher potential battery block 100a and the sixteen lithium ion battery cells 140 constituting the battery assembly 120 of the lower potential battery block 100b, are assigned to eight groups. More specifically, the thirty-two lithium ion battery cells 140 having been electrically connected in series are divided every four cells in order of connection from higher-order in potential so as to constitute the eight groups. In other words, the thirty-two lithium ion battery cells 140 are grouped in the following manner: a lithium ion battery cell group with the first lithium ion battery cell 140 in potential to the fourth lithium ion battery cell 140 in potential having been electrically connected in series is designated as the first group, a lithium ion battery cell group with the fifth lithium ion battery cell 140 in potential to the eighth lithium ion battery cell 140 in potential having been electrically connected in series is designated as the second group, . . . , a lithium ion battery cell group with the twenty-fifth lithium ion battery cell 140 in potential to the twenty-eighth lithium ion battery cell 140 in potential having been electrically connected in series is designated as the seventh group, and a lithium ion battery cell group with the twenty-ninth lithium ion battery cell 140 in potential to the thirty-second lithium ion battery cell 140 in potential having been electrically connected in series is designated as the eighth group.

It is to be noted that while the explanation is given with an example in which the plurality of lithium ion battery cells 140 are divided into eight groups for each of the battery blocks, the thirty-two lithium ion battery cells 140 may instead be divided into six groups. In this case, the thirty-two lithium ion battery cells 140 having been electrically connected in series are grouped in order from higher-order in potential, for example, in the following manner: the first group constituted with the higher four lithium ion battery cells 140, the second to the fifth groups, each constituted with the subsequent six lithium ion battery cells 140, and the sixth group constituted with the subsequent four lithium ion battery cells 140.

The positive pole-side and the negative pole-side of each of the four lithium ion battery cells 140 (BC1 to BC4) constituting the first group are electrically connected to integrated circuit 210 through the connecting wire 800 and a board wiring 921. As a result, analog signals are loaded into the integrated circuit 210 through the connecting wire 800 and the board wiring 921 in response to terminal voltages at each of the four lithium ion battery cells 140 constituting the first group. The integrated circuit 210 includes an analog-to-digital converter so as to convert the loaded analog signals into digital signals in sequence and detect terminal voltages at the four lithium ion battery cells 140 constituting the first group. As is the case with the integrated circuit 210, the integrated circuits 211 to 218 are each electrically connected through the connecting wire 800 and the board wiring 921 to the positive pole-side and the negative pole-side of the four lithium ion battery cells 140 constituting the group corresponding thereto, and receive and detect terminal voltage at each of the four lithium ion battery cells 140 constituting the group corresponding thereto.

The resistors 220 (R1 to R4) and bypass series circuits in which switching semiconductor devices built in the integrated circuit 210 are electrically connected in series are electrically connected in parallel through the connecting wire 800 and the board wiring 921 between the positive pole-side and the negative pole-side (between terminals) of each of the four lithium ion battery cells 140 constituting the first group. In the other groups, as is the case with the first group, bypass series circuits are electrically connected in parallel between the positive pole-side and the negative pole-side of the lithium ion battery cells 140.

Based upon a state of charge adjustment command having been output from the battery controller 300, the integrated circuit 210 sets the switching semiconductor devices in a continuous state individually for a predetermined length of time, and electrically connects bypass series circuits individually in parallel between the positive pole-side and the negative pole-side of the four lithium ion battery cells 140 constituting the first group. As a result, the lithium ion battery cells 140 in which the bypass series circuits are electrically connected in parallel discharge, so that the state of charge SOC is adjusted. As is the case with the integrated circuit 210, the integrated circuits 211 to 218 individually control current on/off operation at the switching semiconductor devices of the bypass series circuits electrically connected in parallel to the four lithium ion battery cells 140 constituting the group corresponding thereto so as to individually adjust the states of charge SOC at the four lithium ion battery cells 140 constituting the group corresponding thereto.

As described above, since the integrated circuits 210 to 218 individually control current on/off operation at the switching semiconductor devices of the bypass series circuits electrically connected in parallel to the four lithium ion battery cells 140 constituting the group corresponding thereto and individually adjust the states of charge SOC at the four lithium ion battery cells 140 constituting each of the groups, uniformity is achieved with regard to the states of charge SOC at the lithium ion battery cells 140 of all the groups so as to inhibit the lithium ion battery cells 140 from being over-charged and the like.

The integrated circuits 210 to 218 detect abnormal states of the four lithium ion battery cells 140 constituting the group corresponding thereto. The abnormal states include an over-charge and an over-discharge. An over-charge and an over-discharge are detected at each of the integrated circuits 210 to 218 by comparing detected value of terminal voltages at the four lithium ion battery cells 140 constituting the group corresponding thereto with each of an over-charge threshold value and an over-discharge threshold value. An over-charge is determined in the event that a detected value of terminal voltage exceeds the over-charge threshold value, while an over-discharge is determined in the event that a detected value of terminal voltage falls below the over-discharge threshold value. In addition, the integrated circuits 210 to 218 self-diagnose abnormalities in their own internal circuits such as an abnormality in the switching semiconductor devices used to adjust the state of charge and an abnormality in temperature.

As described above, the integrated circuits 210 to 218 are each constituted with the same internal circuit so as to execute the same functions, i.e., terminal voltage detection at the four lithium ion battery cells 140 (BC1 to BC4) of the corresponding group, adjustment of the states of charge, detection of an abnormal state, and abnormality diagnosis at their own internal circuits.

A plurality of terminals to be electrically connected to the battery module 100 are provided on one side of each of the integrated circuits 210 to 218. The plurality of terminals include a power source terminal (Vcc), voltage terminals (V1 to V4 and GND), and bypass terminals (B1 to B4). The board wiring 921 that is electrically connected to the connecting wire 800 is electrically connected to the voltage terminals (V1 to V4 and GND). The switching semiconductor device sides of the resistors 220 are electrically connected to the bypass terminals (B1 to B4) through the board wiring 921. The other sides of the resistors 220, i.e., the opposite the switching semiconductor device sides, are electrically connected to the board wiring 921 that is electrically connected to the voltage terminals through the board wiring 921. The board wiring 921 electrically connected to the voltage terminal V1 (the voltage terminal to be electrically connected to the positive pole-side of the lithium ion battery cell 140 (battery cell BC1) of the highest potential) is electrically connected to the power source terminal (Vcc).

Both of the voltage terminals (V1 to V4 and GND) and the bypass terminals (B1 to B4) are alternately disposed in order of potential at the lithium ion battery cells 140 to be electrically connected. As a result, an electrical connection circuit can be configured with ease between each of the integrated circuits 210 to 218 and the connecting wire 800.

The voltage terminal GND is electrically connected to the negative pole-side of the lithium battery cell BC4 of the lowest potential among the four lithium ion battery cells 140 constituting the group corresponding thereto. As a result, each of the integrated circuits 210 to 218 operates on the lowest potential at the corresponding group as the reference potential. Thus, a variety of the reference potentials at the integrated circuits 210 to 218 results in a reduction in the difference in voltages applied from the battery module 100 to each of the integrated circuits 210 to 218, therefore, the voltage tolerance level of the integrated circuits 210 to 218 can be lowered, and safety and reliability can be improved.

The power source terminal Vcc is electrically connected to the positive pole-side of the lithium battery cell BC1 of the highest potential among the four lithium ion battery cells 140 constituting the group corresponding thereto. As a result, the integrated circuits 210 to 218 each generate voltage (for example, 5 v) to operate the internal circuit from the voltage of the highest potential at the corresponding group. Thus, operating voltage of the internal circuit at each of the integrated circuits 210 to 218 is generated from the voltage of the highest potential at the corresponding group so as to equalize the electric power consumed at the four lithium ion battery cells 140 constituting the group corresponding thereto and inhibit the states of charge SOC from becoming imbalanced at the four lithium ion battery cells 140 constituting the group corresponding thereto.

A plurality of communication terminals are provided on the other side (on the side opposite the one side on which the voltage terminals are provided) of each of the integrated circuits 210 to 218. The plurality of terminals include communication command signal transmission/reception terminals (TX and RX) via which communication command signals are transmitted or received and abnormality signal transmission/reception terminals (FFO and FFI) via which abnormality signals and abnormality test signals are transmitted or received.

The communication command signal transmission/reception terminals (TX and RX) of the integrated circuits 210 to 218 are electrically connected in series in an uninsulated state in order of the potential of the corresponding groups. In other words, the communication command signal transmission terminal (TX) and the communication command signal reception terminal (RX) are electrically connected in series in an uninsulated state as follows: the communication command signal transmission terminal (TX) of the integrated circuit 210 (the integrated circuit of the highest order potential) and the communication command signal reception terminal (RX) of the integrated circuit 211 (the integrated circuit of a lower order potential, i.e., the integrated circuit of the next highest potential to the integrated circuit of the highest potential) are electrically connected in series in an uninsulated state; the communication command signal transmission terminal (TX) of the integrated circuit 211 and the communication command signal reception terminal (RX) of the integrated circuit 212 are electrically connected in series in an uninsulated state; . . . ; and, the communication command signal transmission terminal (TX) of the integrated circuit 217 and the communication command signal reception terminal (RX) of the integrated circuit 218 are electrically connected in series in an uninsulated state. In the present embodiment, this kind of connection method is called a daisy chain connection.

The abnormality signal transmission/reception terminals (FFO and FFI) of the integrated circuits 210 to 218 are in the same connection relationship as the communication command signal transmission/reception terminals (TX and RX) are, and electrically connected in series in an uninsulated state in order of the potential of the corresponding groups. In other words, the abnormality signal transmission terminal (FFO) of the integrated circuit of the highest order potential and the abnormality signal reception terminal (FFI) of the integrated circuit of a lower order potential, i.e., the integrated circuit of the next highest potential to the integrated circuit of the highest potential are electrically connected in series in an uninsulated state.

The light receiving side of the photocoupler 231 (PH1) is electrically connected to the communication command signal reception terminal (RX) of the integrated circuit 210 that corresponds to the group of the highest potential of the plurality of lithium ion battery cells 140. The communication command signal transmission terminal (TX) of the microcomputer 310 is electrically connected to the light emitting side of the photocoupler 231. The light emitting side of the photocoupler 241 (PH3) is electrically connected to the communication command signal transmission terminal (TX) of the integrated circuit 218 that corresponds to the group of the lowest potential of the plurality of lithium ion battery cells 140. The communication command signal reception terminal (RX) of the microcomputer 310 is electrically connected to the light receiving side of the photocoupler 241. These connections allow the cell controller 200 and the battery controller 300 to be electrically insulated therebetween, and allow a communication command signal loop transmission path 250 to be formed in order from the microcomputer 310 via the photocoupler 231, the integrated circuit 210, . . . , the integrated circuit 218, and the photocoupler 241 to the microcomputer 310. The loop transmission path 250 is a serial transmission path.

The communication command signal having been output from the microcomputer 310 is transmitted through the communication command signal loop transmission path 250. The communication command signal is a signal of a plurality of bytes in which a plurality of regions such as a data region to show communication (control) contents are provided, and transmitted in a loop according to the transmission order described above.

The communication command signals that are output from the microcomputer 310 to the integrated circuits 210 to 218 through the communication command signal loop transmission path 250 include a request signal to request detected terminal voltages at the lithium ion battery cells 140, a command signal to adjust the state of charge at the lithium ion battery cells 140, a start-up signal to shift each of the integrated circuits 210 to 218 from a sleep state into an operating state, i.e., to start up each of them, a stop signal to shift each of the integrated circuits 210 to 218 from an operating state into a sleep state, i.e., to stop the operation, an address setting signal to set an address for communication of each of the integrated circuits 210 to 218, and an abnormality confirmation signal to confirm abnormal states of the integrated circuits 210 to 218.

It is to be noted that while in the embodiment the explanation is given with an example in which the communication command signal is transmitted from the integrated circuit 210 to the integrated circuit 218, the communication command signal may instead be transmitted from the integrated circuit 218 to the integrated circuit 210.

The light receiving side of the photocoupler 232 (PH2) is electrically connected to the abnormality signal reception terminal (FFI) of the integrated circuit 210 that corresponds to the group of the highest potential of the plurality of lithium ion battery cells 140. An abnormality test signal transmission terminal (FFTEST) of the microcomputer 310 is electrically connected to the light emitting side of the photocoupler 232. The light emitting side of the photocoupler 242 (PH4) is electrically connected to the abnormality signal transmission terminal (FFO) of the integrated circuit 218 that corresponds to the group of the lowest potential of the plurality of lithium ion battery cells 140. The abnormality signal reception terminal (FF) of the microcomputer 310 is electrically connected to the light receiving side of the photocoupler 242. These connections allow the cell controller 200 and the battery controller 300 to be electrically insulated therebetween, and allow an abnormality signal loop transmission path 260 to be formed in order from the microcomputer 310 via the photocoupler 232, the integrated circuit 210, . . . , the integrated circuit 218, and the photocoupler 242 to the microcomputer 310. The loop transmission path 260 is a serial transmission path.

The abnormality test signal having been output from the microcomputer 310 is transmitted through the abnormality signal loop transmission path 260. The abnormality test signal is a high level signal of one bit that is transmitted so as to detect abnormalities at the integrated circuits 210 to 218, disconnection in the signal communication circuit, and so on according to the transmission order described above. In the event of an abnormality, the abnormality test signal returns to the microcomputer 310 as a low level signal. The microcomputer 310 thus detects abnormalities at the integrated circuits 210 to 218, disconnection in the signal communication circuit, and so on. In the event that an abnormality is detected in any of the integrated circuits 210 to 218, a signal that indicates an abnormality is output from the integrated circuit in which the abnormality has been detected, for example, the integrated circuit 212 to the abnormality signal loop transmission path 260. The signal that indicates an abnormality is a one-bit signal that is transmitted to the microcomputer 310 via the integrated circuit 213, . . . , the integrated circuit 218, and the photocoupler 242 in this order. As a result, an abnormality can be promptly reported from the integrated circuit in which the abnormality is detected to the microcomputer 310.

It is to be noted that while in the embodiment the explanation is given with an example in which the abnormality test signal is transmitted from the integrated circuit 210 to the integrated circuit 218, the abnormality test signal may instead be transmitted from the integrated circuit 218 to the integrated circuit 210. In addition, while in the present embodiment an explanation will be given with an example in which the signal that indicates an abnormality is transmitted from the integrated circuit in which the abnormality is detected to a lower-order integrated circuit in potential, the signal that indicates an abnormality may instead be transmitted from the integrated circuit in which the abnormality is detected to a higher-order integrated circuit in potential.

The photocouplers 231, 232, 241, and 242 (PH1 to PH4) electrically insulate the communication command signal loop transmission path 250 and the abnormality signal loop transmission path 260 between the cell controller 200 and the battery controller 300, and convert the signals transmitted and received between the cell controller 200 and the battery controller 300 into light and transmit them. As described above, the cell controller 200 and the battery controller 300 are significantly different in the power source potential and power source voltage. Accordingly, an attempt to electrically connect between the cell controller 200 and the battery controller 300 and to execute a signal transmission requires potential conversion and voltage conversion of the signal to be transmitted will cause an interface circuit between the cell controller 200 and the battery controller 300 to be expanded and expensive, thereby failing to provide a downsized, inexpensive control device. For this reason, in the embodiment, communication between the cell controller 200 and the battery controller 300 is executed using the photocouplers 231, 232, 241, and 242 (PH1 to PH4) so as to make the control device downsized and less expensive.

As described above, the power source potential may vary between each of the integrated circuits 210 to 218 as well. However, since in the embodiment the integrated circuits 210 to 218 are electrically connected in series, i.e., connected in a daisy chain configuration, according to the order of potential at the corresponding group of the battery assembly 120, a signal transmission between each of the integrated circuits 210 to 218 can be executed with ease by potential conversion (level shift). Each of the integrated circuits 210 to 218 is provided with a potential conversion (level shift) circuit on the signal reception side. Accordingly, in the embodiment a downsized, inexpensive control device can be provided because a signal transmission between each of the integrated circuits 210 to 218 can be executed without providing photocouplers, which are more expensive than other circuit elements.

Various signals are input to the microcomputer 310 and, based upon input information having been obtained from the input signal or based upon calculation information having been calculated from the input signal, the microcomputer 310 transmits the communication command signal described above to the cell controller 200 and outputs a signal to the higher-order control devices (the motor controller 23 and the vehicle controller 30).

The various signals to be input to the microcomputer 310 include a terminal voltage signal of each of the lithium ion battery cells 140 having been output from each of the integrated circuits 210 to 218, an abnormality signal having been output from the integrated circuit in which the abnormality is detected among the integrated circuits 210 to 218, a current sensor signal having been output from the current sensor 430 that detects charged and discharged current at the battery module 100, a voltage sensor signal having been output from the voltage sensor 930 that detects the total voltage at the battery module 100, a temperature sensor signal having been output from the temperature sensor (for instance, thermistor element) 940 that is provided inside the battery module 100 to detect the temperature at the battery assembly 120, an ON/Off signal based upon the operation of the ignition key switch, and a signal having been output from the higher-order control devices (the motor controller 23 and the vehicle controller 30).

The various signals to be output from the microcomputer 310 include the communication command signal described above, signals that correspond to pieces of information with regard to chargeable and dischargeable electric power, the state of charge SOC, the state of health SOH, and the like having been calculated based upon state information (for instance, voltage, current, temperature, and the like) of the battery module 100, and signals that correspond to abnormality state information (for example, over-charge, over-discharge, overheat, and the like) having been determined from the calculation results of the state of the battery module 100 based upon information (for instance, voltage, current, temperature, and the like) or abnormality information.

Among those output signals, the signals that correspond to pieces of information with regard to chargeable and dischargeable electric power, the state of charge SOC, the state of health SOH, and the like, and the signals that correspond to abnormality state information (for example, over-charge, over-discharge, overheat, and the like) are output to the higher-order control devices (the motor controller 23 and the vehicle controller 30).

Figure 10:
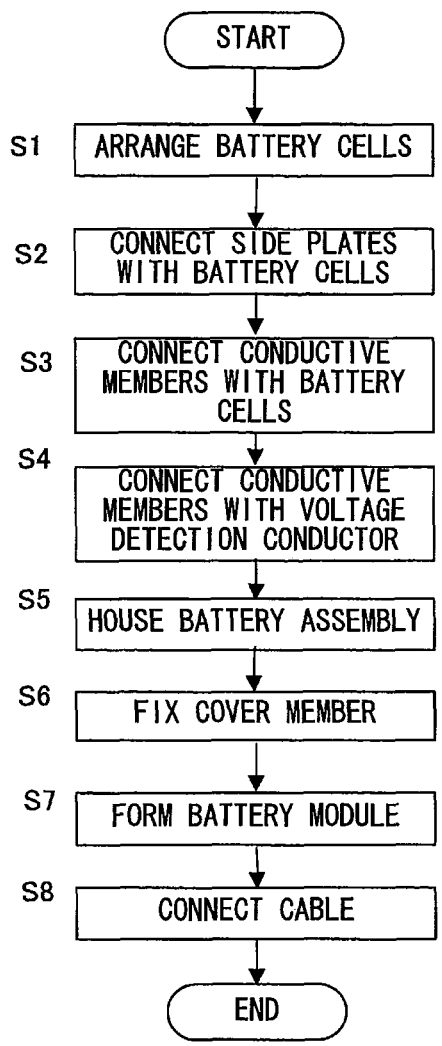
FIG. 10 is a flowchart of the manufacturing process of the lithium ion battery device.

The manufacturing process, particularly assembling process of the lithium ion battery device 1000 that is constituted with the battery module 100 and the control device 900 explained above in reference to a flowchart in FIG. 10.

At first, in step S1, assembly of the higher potential battery block 100a and the lower potential battery module 100b is started. More specifically, the sixteen lithium ion battery cells 140 are arranged on a carrier so as to constitute the battery assembly 120. At this time, the lithium ion battery cells 140 are placed vertically on the carrier in the state in which they are supported using a jig so as not to fall down, i.e., they are placed vertically so that terminal surfaces of the lithium ion battery cells 140 are in parallel with the surface of the carrier and the central axes thereof extend vertically.

In step S2, one of the side plates 130 and 131, e.g., the side plate 130 is joined with adhesive to an upper portion of each of the lithium ion battery cells 140 aligned in step S1. In this situation, the adhesive has appropriate flexibility, so that it has a function of bonding between the side plate 130 and the lithium ion battery cells 140 and a function of sealing therebetween. The use of adhesive having flexibility assures air tightness and liquid tightness of the cooling channel inside the casing 110 including the side plate 130 and the gas release chamber outside the casing 110 including the side plate 130, and, for example, even in the event that the battery module 100 is vibrated, absorbs the vibration, thereby allowing the connection state of the side plate 130 and the lithium ion battery cells 140 to remain. It is to be noted that liquid gasket having the functions mentioned above may instead be used as an adhesive member.

Next, the other of the side plates 130 and 131, i.e., the side plate 131 is connected to the lithium ion battery cells 140. The lithium ion batteries 140 connected to the side plate 130 are placed upside down on the carrier so that the unjoined terminal surface of each of the lithium ion battery cells 140 faces upward. Then, as described above, the side plate 131 is joined to the upper portion of each of the lithium ion battery cells 140 using the adhesive.

In step S3, each of the lithium ion battery cells 140 and the conductive members 150 are connected. At first, as shown in FIG. 8, the through-holes 155 of the conductive members 150 are fitted to the fixed guides 130a of one of the side plates 130 and 131, e.g., the side plate 130 so as to mount the conductive members 150 on the side plate 130. Then, the welding sections 152 of the conductive members 150 and the terminal surface of the corresponding lithium ion battery cell 140 are joined by tungsten inert gas (TIG) welding. Likewise, the conductive members 150 are mounted on the other of the side plates 130 and 131, i.e., the side plate 131 as well, and the welding sections 152 of the conductive members 150 and the lithium ion battery cells 140 are joined by TIG welding. It is to be noted the process may be as follows: the side plate 130 is joined to the lithium ion battery cells 140 and the conductive members 150 are welded to the lithium ion battery cells 140, before the side plate 131 is joined to the lithium ion battery cells 140 and the conductive members 150 are welded to the lithium ion battery cells 140.

In the following step S4, the conductive members 150 and the front end sections 800a of the voltage detection conductor 805 are connected. More specifically, the abutting sections 154 of the conductive members 150 and the front end sections 800a of the voltage detection conductor 805 are joined by TIG welding in the state in which the abutting sections 154 of the conductive members 150 abut against the front end sections 800a of the voltage detection conductor 805.

In step S5, the inlet channel forming plate 111, the outlet-side guide plate 113, the cooling medium inlet 114, and the cooling medium inlet duct 116 are integrally formed, and, the outlet channel forming plate 118, the inlet-side guide plate 112, the cooling medium outlet 115, and the cooling medium outlet duct 117 are integrally formed. Then, these are joined to the assembly prepared in steps S1 to S4 via the sealing member (not shown) and fixed to the side plates 130 and 131 with fixing means such as bolts, screws, or rivets. As a result, the battery assembly 120 is housed in the casing 110.

In step S6, the cover member 160 is joined to each of the side plates 130 and 131 via a sealing member 135 and fixed with the fixing means 161 such as bolts, screws, or rivets. The sealing member 135 is an elastic, circular sealing member (for instance, a rubber O-ring) that is fitted in a groove 134 formed on the side plate 130. Liquid gasket may instead be used as the sealing member 135.

In the following step S7, the two assemblies (the battery blocks 100a and 100b) prepared in step S6 are placed so that the longitudinal directions thereof are in parallel with each other, and the module base 101 is joined to the battery blocks 100a and 100b in the state in which the two battery blocks 100a and 100b are juxtaposed. The module base 101 is fixed to the side plates 130 and 131 with a fixing means such as bolts, screws, or rivets. The casing of the control device 900 is fixed to the middle section in the longitudinal direction of each of the two battery blocks 100a and 100b with a fixing means such as bolts, screws, or rivets. As a result, the battery module 100 is formed.

It is to be noted that the assembly sequence of each of the component members that constitute the battery module 100 is not limited to that described above, and the fixation sequence of each of the component members may be modified.

Next, in step S8, the connectors of the connecting wire 800 are each connected to the connection terminals 810 of the battery module 100 and the connector 912 of the control device 900. The connector of the signal line extending from the plurality of temperature sensors (not shown) provided in each of the battery blocks 100a and 100b of the battery module 100 is connected to the connector 913 of the control device 900. In addition, a connector of the communication line for communicating with the higher-order control devices such as the vehicle controller 30 and the motor controller 23 therethrough is connected to the connector of the control device 900.

The lithium ion battery device 1000 is completed through the assembly operation in steps S1 to S8.

The following operations and advantageous effects can be achieved by the electric storage module (the battery module 100) and the electric storage device (the lithium ion battery device 1000) according to the embodiment explained above.
(1) The battery module 100 includes the plurality of battery cells 140, the casing 110 in which the plurality of cells 140 are housed, the plurality of conductive members 150 to electrically connect the plurality of cells 140, and the voltage detection conductor 805 to detect voltages at each of the plurality of cells 140. The casing 110 includes at least a pair of the resin side plates 130 and 131 that sandwich the plurality of cells 140 from both sides to support them. As shown in FIGS. 6 and 7, the voltage detection conductor 805 is formed in a predetermined shape and integrated with the side plates 130 and 131. As a result, a space and a complicated manufacturing process in which lead wires for voltage detection are manually wired on the side plates 130 and 131 are not required, therefore the battery module 100 can be manufactured efficiently. In particular, the voltage detection conductor 805 can be provided with ease in the battery module 100, which is required to be downsized.

(2) The plurality of conductive members 150 are mounted on the side plates 130 and 131 from the outside of the casing 110 so as to connect the plurality of cells 140. As a result, the conductive members 150 and each of the storage batteries 140 can be connected with ease. It is to be noted that in the embodiment described above, the conductive members 150 and each of the lithium ion battery cells 140 are joined by TIG welding.

(3) The front end section 800*a* of the voltage detection conductor 805 is connected to the plurality of conductive members 150, and the current block device (current block section) 811 that blocks the current from the cells 140 is provided on the other end of the voltage detection conductor 805. The current block section 811 fuses the fuse wire in the event of an abnormality of the control circuit 900 and the wire 800 so as to block the current from the battery assembly 120 and protect the product. The current block section 811 is provided on the other end of the voltage detection conductor 805 so that, for instance, in the event that a short circuit occurs along the wire 800, the current block section 811 blocks current on the other end of the voltage detection conductor 805. As a result, the overall battery module 100 can be protected. In this case, the battery module 100 can be reused by replacing the wire 800 and current block section 811. It is to be noted that since the voltage detection conductor 805 is formed in a predetermined shape and integrated with the side plates 130 and 131, substantially no short circuit occurs in the voltage detection conductor 805 itself.

(4) The voltage detection conductor 805 is insert molded to the resin side plates 130 and 131 in the state in which the voltage detection conductor 805 is maintained in a predetermined shape with the resin material (resin section) 807 so as to be integrated with the side plates 130 and 131. More specifically, the voltage detection conductor 805 is fixed with the resin section 807 so that the formed shape remains so as to prepare the sub-units, and the sub-units are insert molded so as to produce the side plates 130 and 131. The preparation of the sub-units assures shape maintenance of the voltage detection conductor 805, and prevents an erroneous contact between the detection lines 806 of the voltage detection conductor 805 during the production process.

(5) The through-holes 132 are formed on the side plates 130 and 131 at positions corresponding to the plurality of cells 140, and the plurality of cells 140 are mounted on the side plates 130 and 131 with the adhesive member so as to seal the through-holes 132 tightly. As a result, the casing 110 can be sealed between the inside and the outside thereof. In addition, the connection state of the side plates 130 and 131 and the cells 140 can be maintained by the adhesive member absorbing an external force applied to the battery module 100, for example, vibration and the like.

(6) The battery module 100 further includes the metal cover member 160 provided so as to cover the outside of the pair of side plates 130 and 131 with respect to the casing 110, in which the side plates 130 and 131 include the contact prevention mechanisms 130*a* and 133 to prevent the cover member 160 and the conductive members 150 from contacting each other. For instance, in the event that an external force is applied to the cover member 160 to deform the cover member 160 toward the interior of the casing 110, the cover member 160 first contacts with the fixed guides 130*a* or the protruding section 133 that protrude from the surfaces of the side plates 130 and 131. As a result, the occurrence of a short-circuit due to the cover member 160, which is, for example, the steel, and the conductive members 150 contacting each other can be prevented.

(7) The battery device (lithium ion battery device) 1000 includes the battery module 100, and the control device 900 that is connected with the voltage detection conductor 150 so as to detect the voltages at the plurality of battery cells 140 and controls the stored charge at the plurality of cells 140. As described above, since the battery module 100 can be manufactured without any complicated wiring of voltage detection lines, the overall battery device 1000 can be manufactured efficiently.

While in the embodiment explained above the voltage detection conductor 805 having been formed in a predetermined shape is insert molded so as to be integrally formed with the side plates 130 and 131, the method with which the voltage detection conductor 805 and the side plates 130 and 131 are integrated is not limited to that described above. For instance, the voltage detection conductor 805 and the side plates 130 and 131 may be integrated by constituting each of the side plates 130 and 131 with two members and by fitting the voltage detection conductor 805 having been formed in a predetermined shape in between the two members. However, if the voltage detection conductor 805 is fitted in and integrated with the side plates 130 and 131, the side plates 130 and 131, which have been formed by insert molding, tend to increase in thickness. Therefore, it is preferable that the side plates 130 and 131 and the voltage detection conductor 805 are integrally formed by insert molding.

In the embodiment explained above, an example is presented with regard to the battery module 100 constituted with the two battery blocks 100*a* and 100*b* to which the sixteen lithium ion battery cells 140 are connected. However, the present invention is not assumed to be limited to the structure of the battery module 100 and connection configurations (serial and parallel) that are described above, and is applied to a battery module including a various number of the lithium ion battery cells 140, a various number of the battery cell arrays, and various alignments and directions.

In addition, while in the embodiment explained above an example of cylindrical battery cells assumed as the lithium ion battery cells 140 is presented, the present invention is not limited thereto. For instance, the shape of the lithium ion battery cells 140 is applied to rectangular storage batteries and laminate sealed batteries, and also applied to batteries such as nickel-metal hydride batteries other than lithium ion batteries.

The battery device 1000 according to the embodiment described above may be used in vehicle power source systems for other electric vehicles, for instance, train vehicles such as hybrid trains, public transport vehicles such as buses, freight vehicles such as trucks, and work vehicles such as battery forklift trucks.

In addition, the battery device 1000 according to the embodiment may be applied to battery devices that constitute power source systems other than electric vehicles such as uninterruptible power source systems used in computer systems, server systems, and the like and power source systems used in household power generation equipment.

According to the embodiment of the present invention described above, wiring operations of lead wires are not required, so that the voltage detection conductor to detect voltage at a capacitor can be provided with ease.

The above described embodiments are examples, and various modifications can be made without departing from the scope of the invention.

What is claimed is:

1. A battery module comprising:
a plurality of battery cells;
a casing in which the plurality of battery cells are housed;
a plurality of conductive members that electrically connect the plurality of battery cells; and
a voltage detection conductor that constitutes at least a part of an electric circuit, with the electric circuit connecting the plurality of battery cells with a voltage detection circuit that detects voltages at each of the plurality of battery cells and inputting terminal voltages of the plurality of battery cells to the voltage detection circuit, wherein:
the casing comprises at least a pair of resin side plates that sandwich and support the plurality of battery cells from both sides;
the voltage detection conductor comprises a plurality of detection lines that is made of elongated rectangular metal wires formed in a predetermined shape that corresponds to the shape of the side plates, with each detection line extending from a front end section to another end section according to the shape of the side plates, with the front end section of each detection line being connected to a corresponding conductive member so as to be electronically connected with a corresponding battery cell; and
the plurality of detection lines are fixed and integrated together by a resin material so as to maintain the predetermined shape while separated from one another, and the plurality of detection lines thus fixed together is embedded in the side plates by insert molding so as to be integrated with the side plates.

2. A battery module according to claim 1, wherein:
the plurality of conductive members are mounted on the side plates at an outer side of the casing so as to connect the plurality of battery cells.

3. A battery module according to claim 1, wherein:
the another end section of the plurality of detection lines is provided with a current block device that blocks current from the battery cells.

4. A battery module according to claim 1, wherein:
the front end sections of the plurality of detection lines protrude outside the side plates so as to be connected to the plurality of conductive members, respectively.

5. A battery module according to claim 1, wherein:
through-holes are formed on the side plates at positions corresponding to the plurality of battery cells; and
the plurality of battery cells are mounted on the side plates with an adhesive member so as to seal the through-holes tightly.

6. A battery module according to claim 1 further comprising:
a metal cover member provided so as to cover an outside of the pair of side plates with respect to the casing, wherein:
the side plates comprises a contact prevention mechanism to prevent the cover member and the conductive members from contacting each other; and
the contact prevention mechanism comprises a protrusion that protrudes from the side plates towards the cover member.

7. A battery device comprising:
a battery module according to claim 1; and
a control device that is connected with the voltage detection conductor so as to detect voltages at the plurality of battery cells and controls stored charge at the plurality of battery cells.

* * * * *